Figure 1:
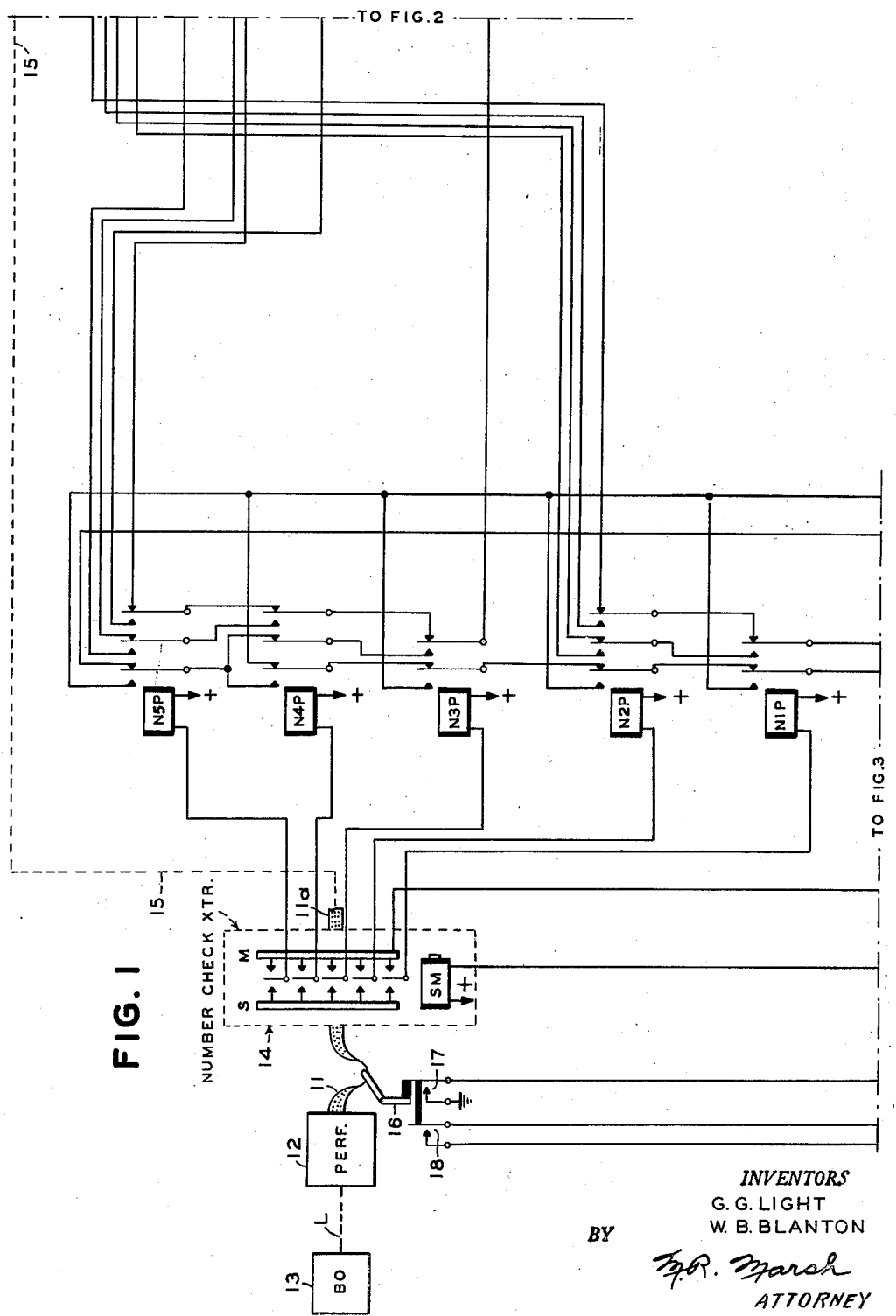

Jan. 15, 1952   G. G. LIGHT ET AL   2,582,707
TELEGRAPH SWITCHING SYSTEM WITH SEQUENCE
MESSAGE NUMBERS CHECKING
Filed July 8, 1948   15 Sheets-Sheet 4

INVENTORS
G. G. LIGHT
W. B. BLANTON
BY
M. R. Marsh
ATTORNEY

Jan. 15, 1952     G. G. LIGHT ET AL     2,582,707
TELEGRAPH SWITCHING SYSTEM WITH SEQUENCE
MESSAGE NUMBERS CHECKING
Filed July 8, 1948     15 Sheets-Sheet 8

INVENTORS
G. G. LIGHT
W. B. BLANTON
BY
ATTORNEY

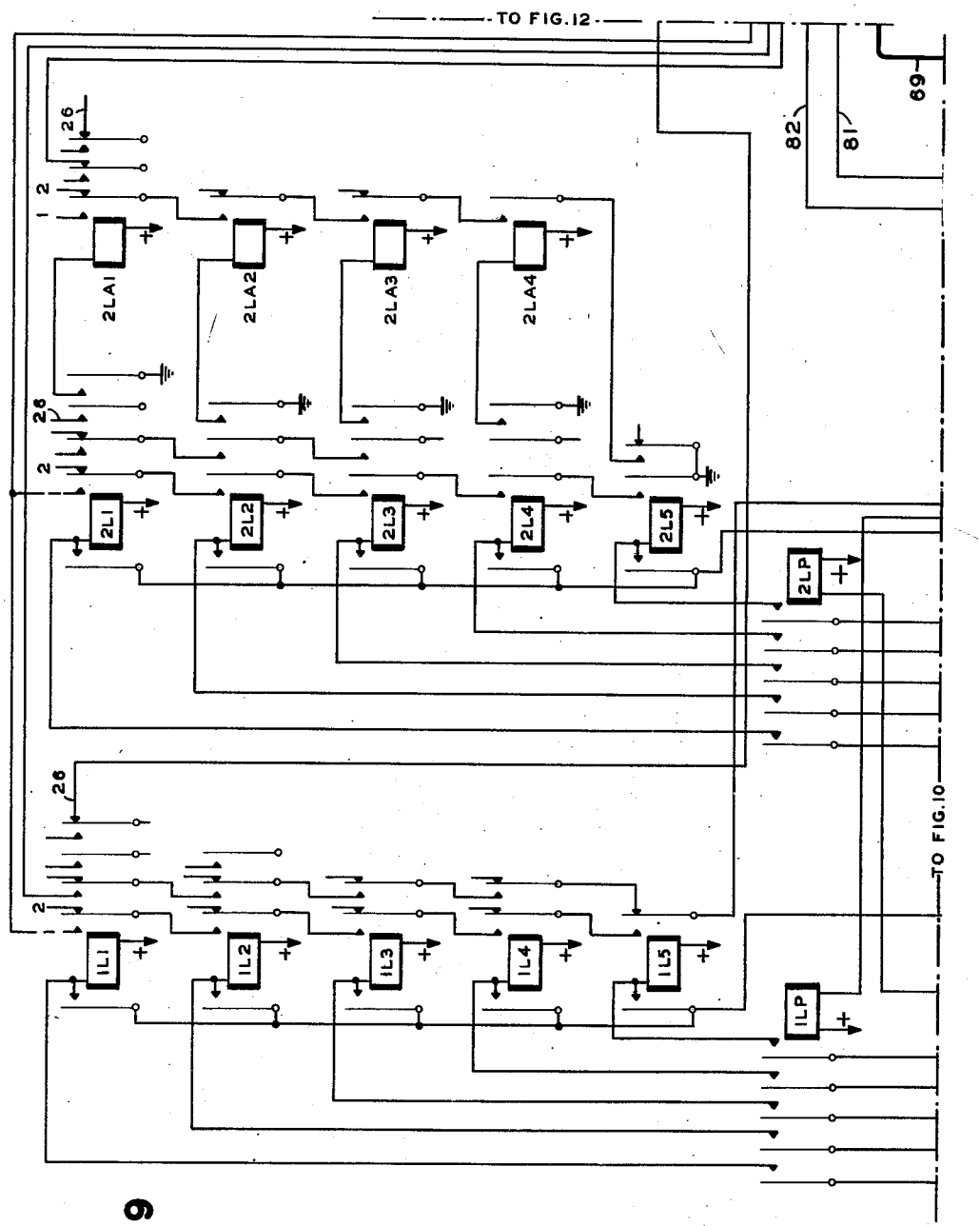

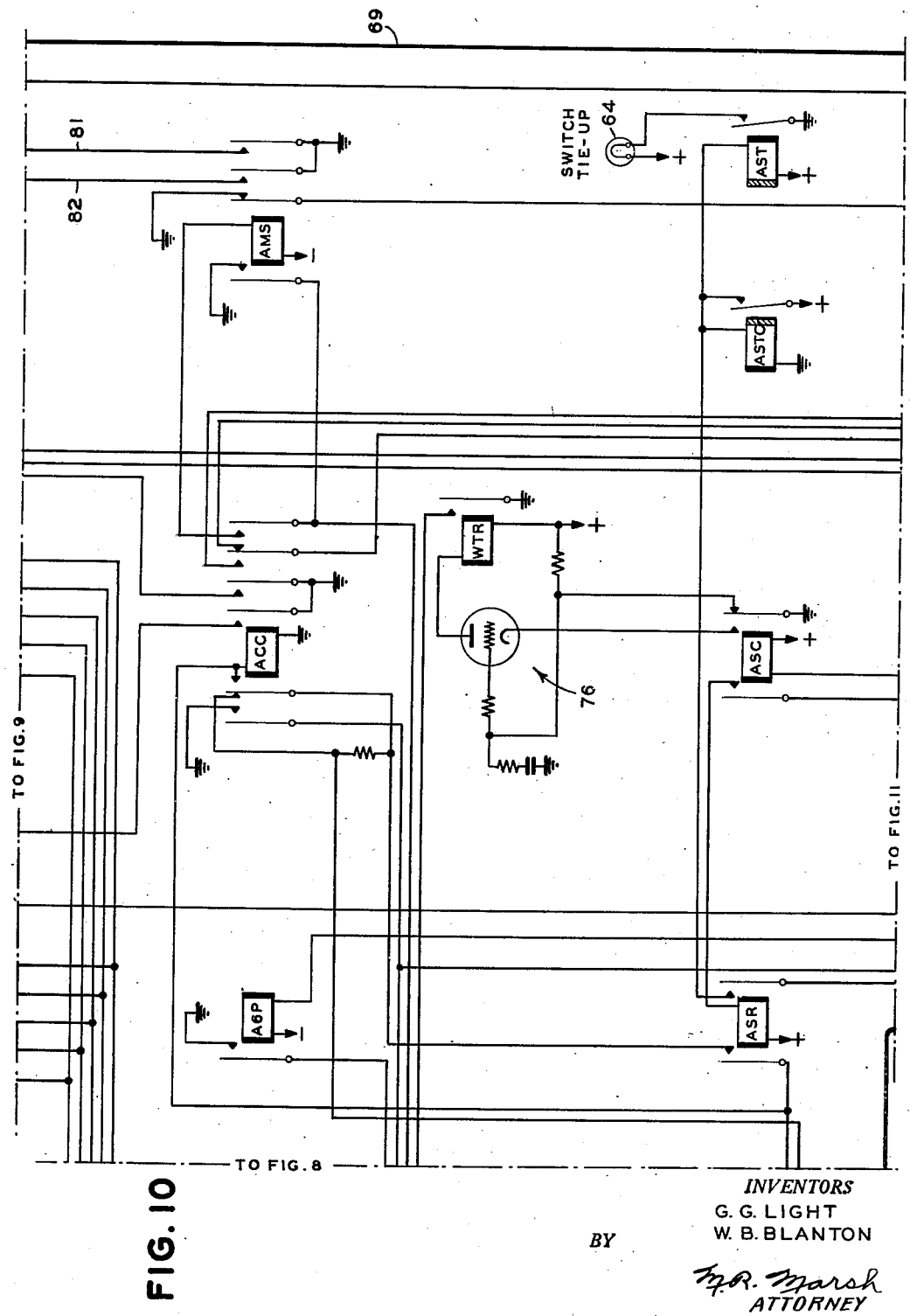

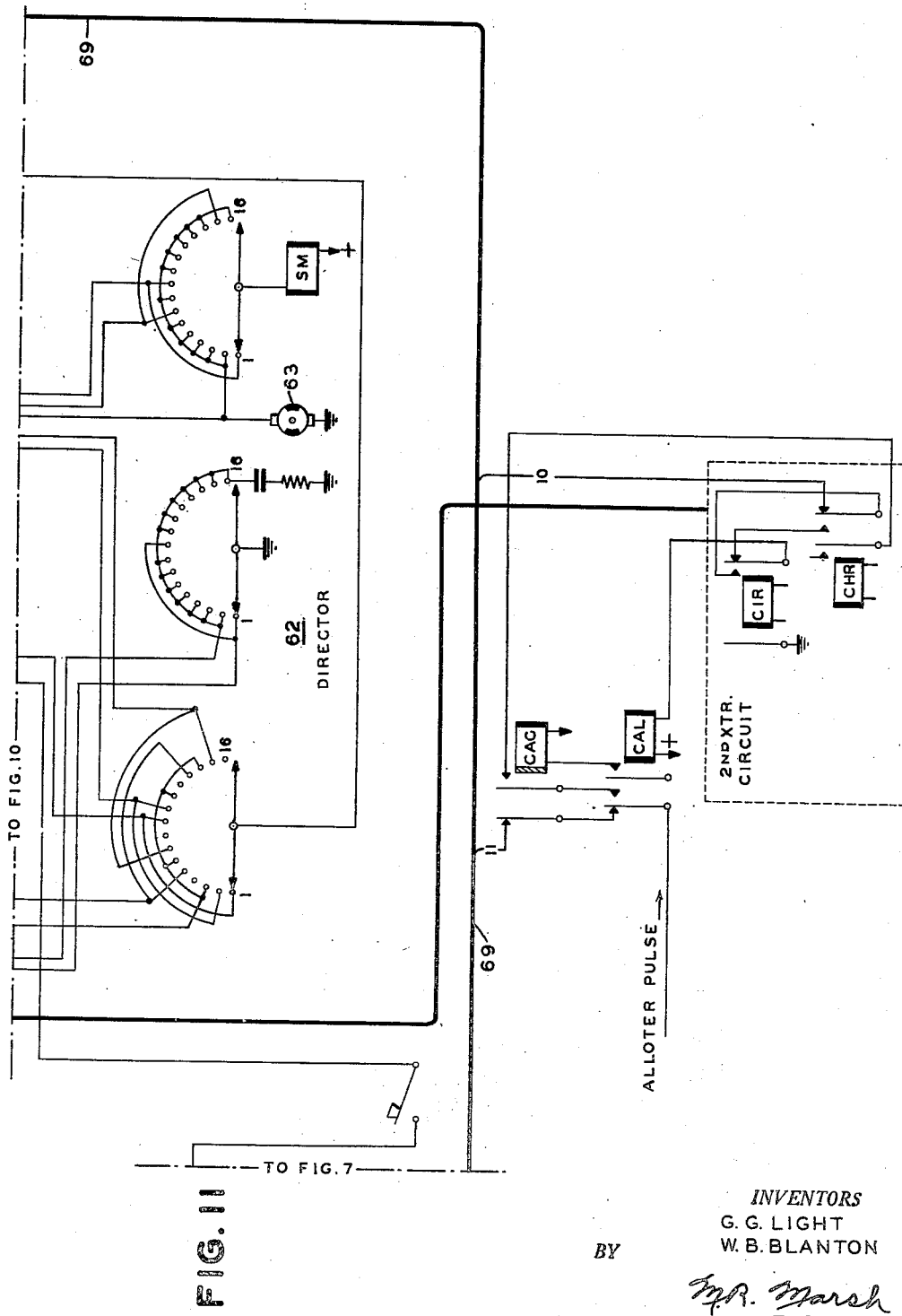

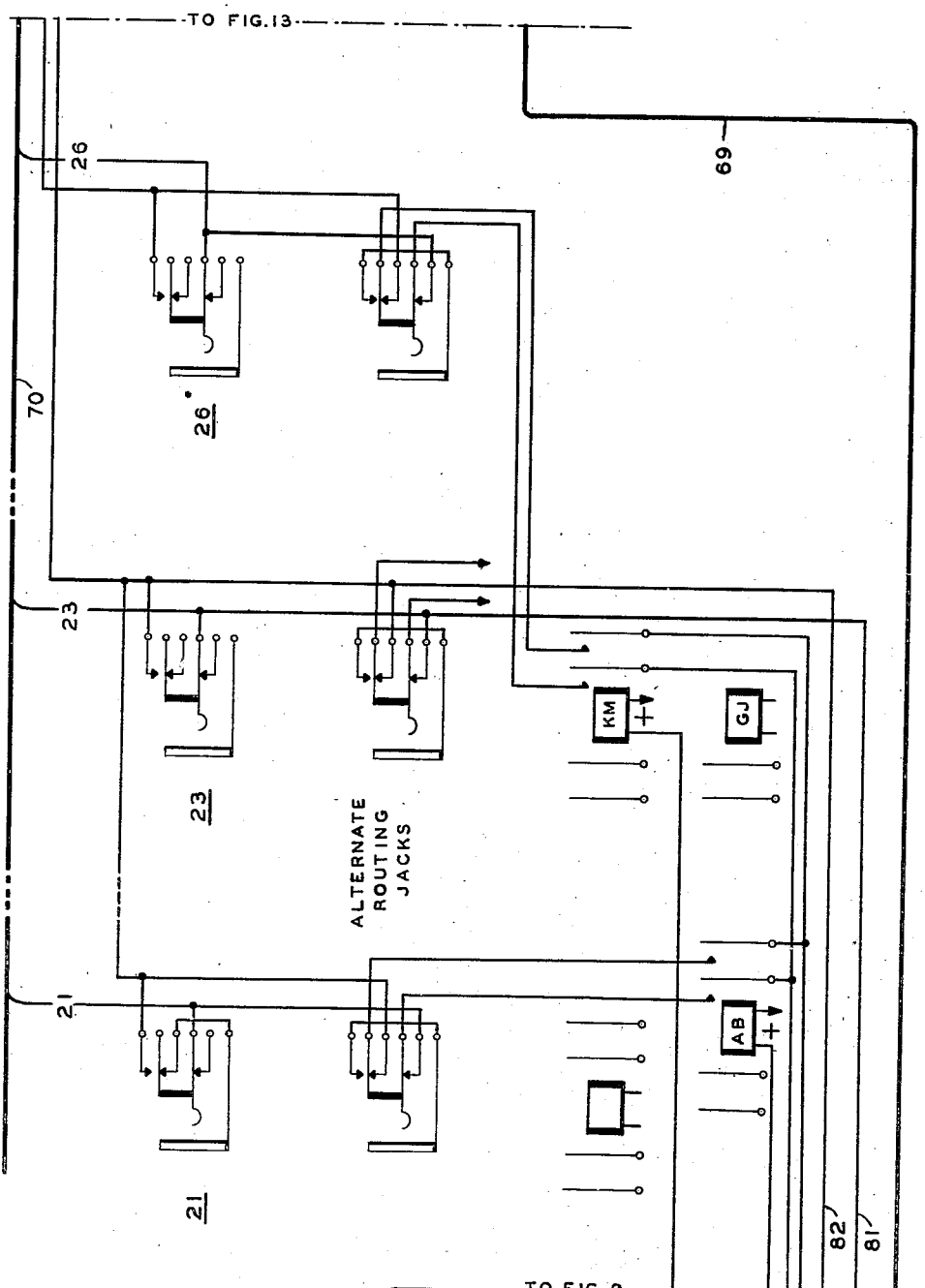

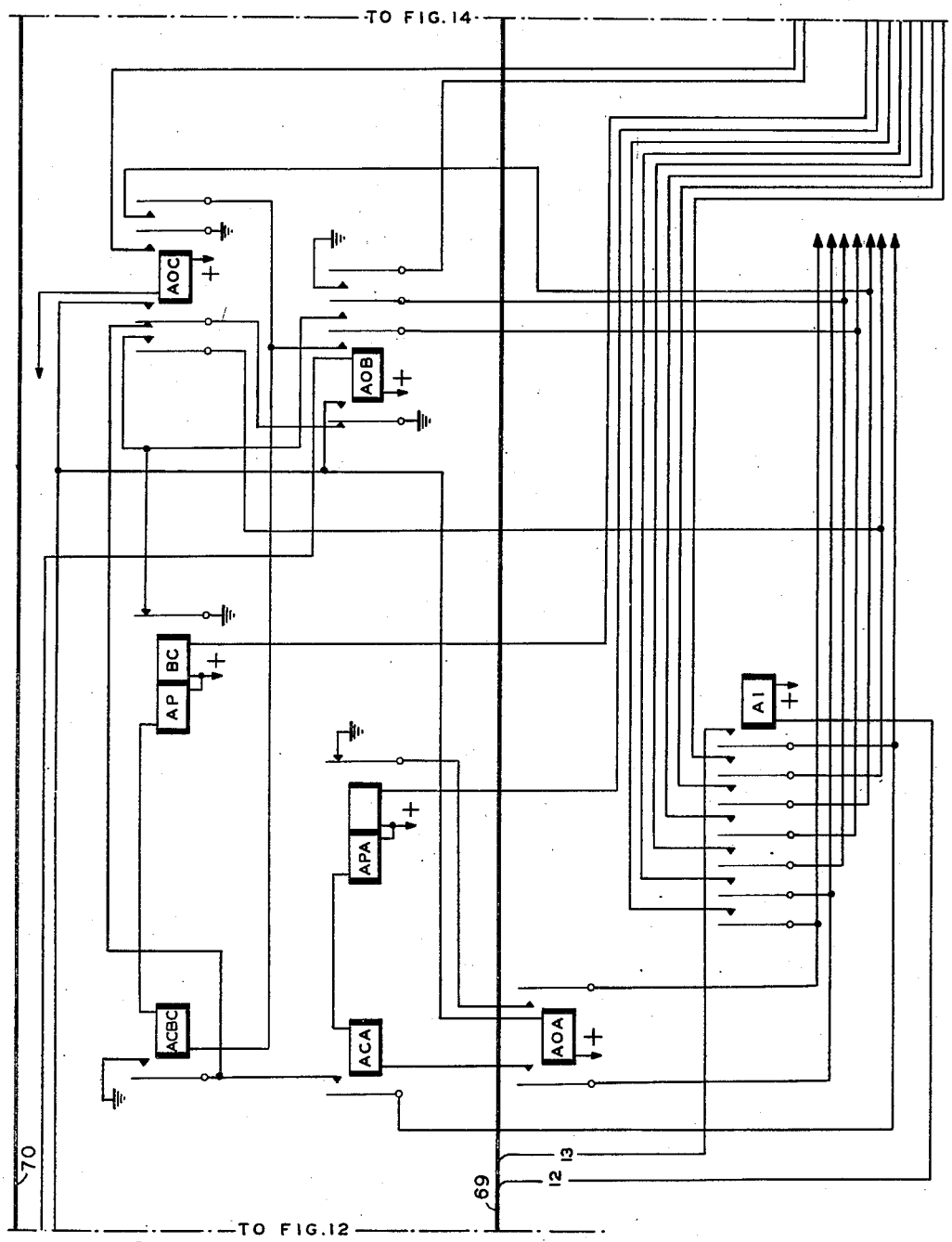

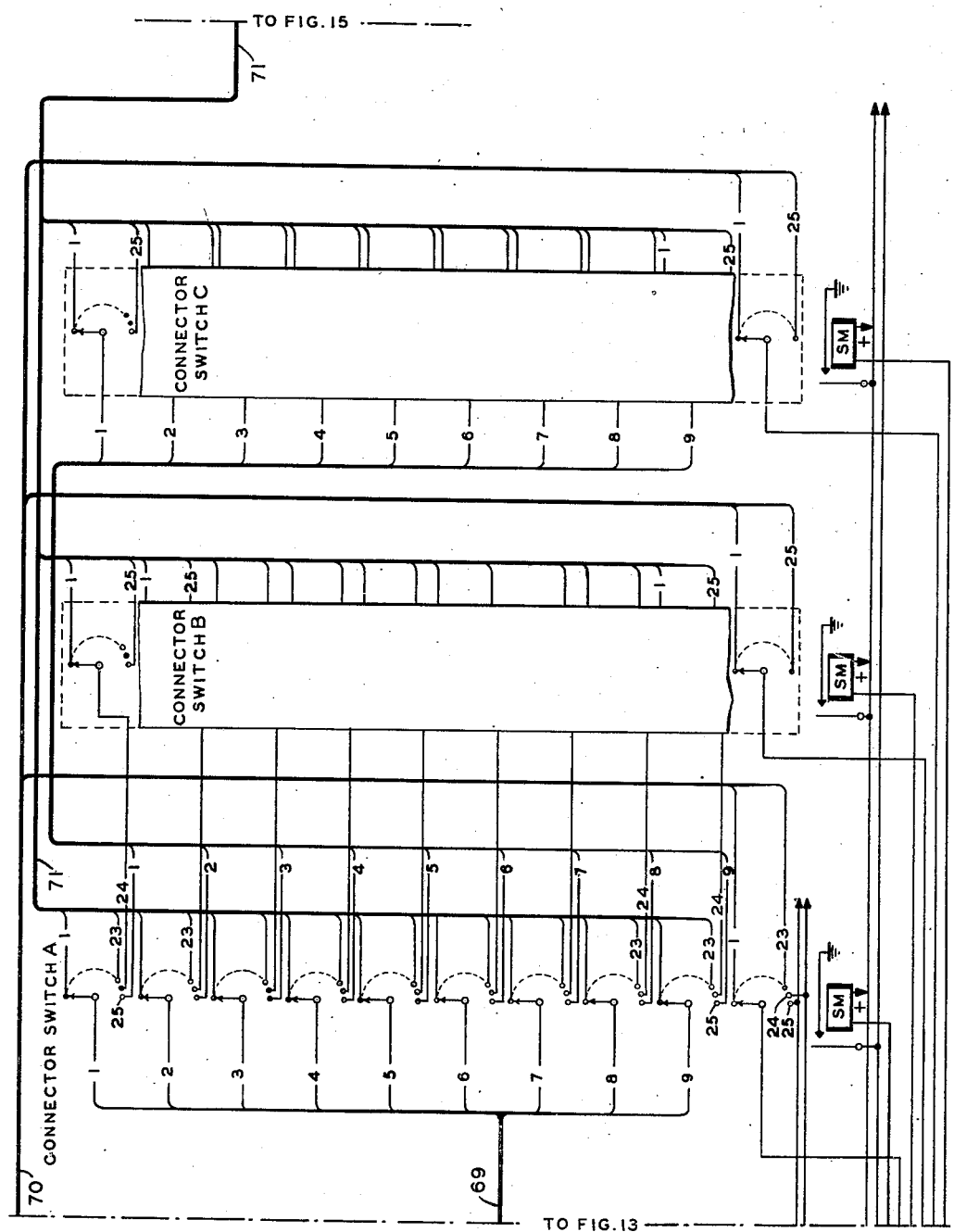

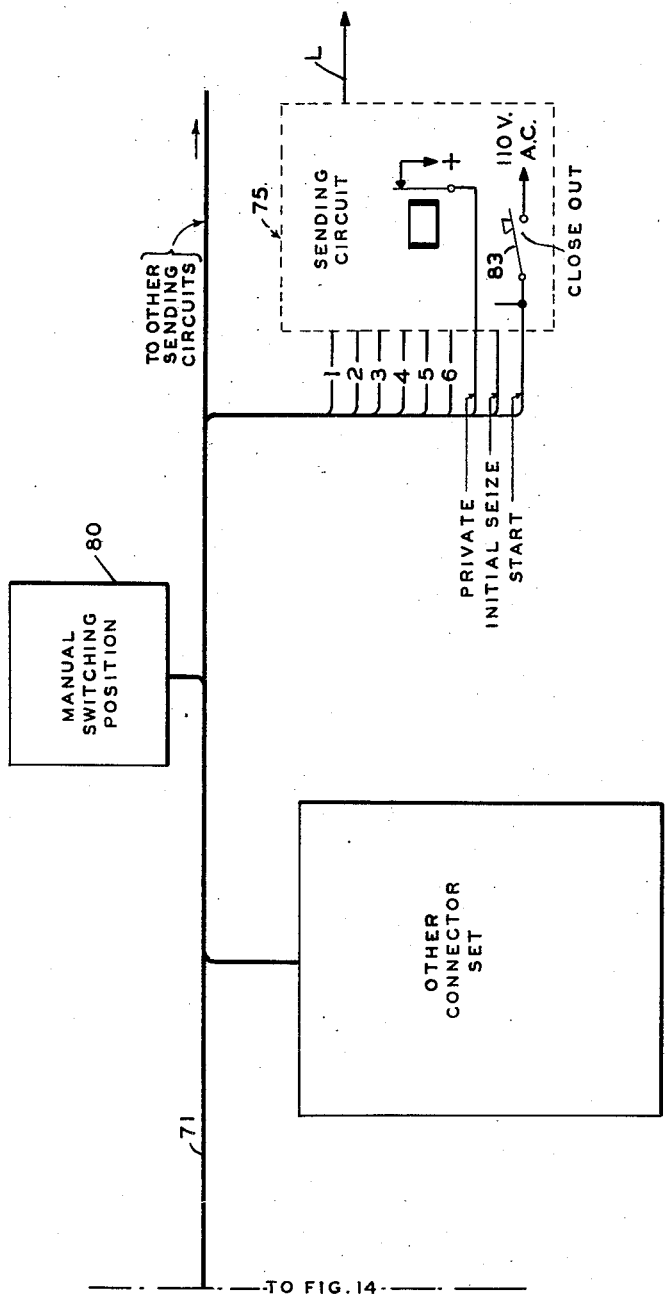

Patented Jan. 15, 1952

2,582,707

UNITED STATES PATENT OFFICE 2,582,707

TELEGRAPH SWITCHING SYSTEM WITH SEQUENCE MESSAGE NUMBERS CHECKING

George G. Light, Scarsdale, and William B. Blanton, Rockville Centre, N. Y., assignors to The Western Union Telegraph Company, New York, N. Y., a corporation of New York Application July 8, 1948, Serial No. 37,555

17 Claims. (Cl. 178—2)

This invention relates to telegraph switching systems and more particularly to a telegraph switching system such as that at a switching center where messages, either those received over an incoming line such as from a branch office or those originating at the switching center, a so-called local sending position, are automatically switched to proper outgoing lines or channels under the control of directing characters preceding the messages.

In order to facilitate the tracing of lost and misdirected messages it is the usual custom to consecutively number messages transmitted over any line or from a local sending position. At the switching center through which such messages may pass it is the usual practice to manually check the numbers and an interruption in the numerical sequence indicates a lost or misdirected message. Such manual checking requires considerable time of the attendant and incurs some delay in the switching of the messages.

In accordance with the above it is one of the objects of the present invention to provide an automatic telegraph switching system wherein the sequence numbers of messages received at the switching center are automatically checked before a switching operation is initiated.

Another object of the invention is to provide a system of the above nature wherein the failure of the message sequence number to check with the sequence of the message prevents an automatic switching of the message and operates an alarm device to apprise the attendant of this condition.

Another object of the invention resides in the provision of an automatic switching system for automatically switching messages to any one of a plurality of outgoing lines or line sending positions and to switching messages that can not be directed to these lines automatically to a predetermined position such as a manually controlled switching arrangement where such messages are manually directed to destinations.

Another object of the invention is to provide an automatic telegraph switching system incorporating the above features and wherein the automatic switching of a message is not initiated until the complete message is received at the switching center and ready for switching.

The above and further objects of the invention will be more apparent from the following detailed description thereof wherein reference is made to the accompanying drawings, in the latter of which:

Figs. 1 to 4 disclose the circuits and equipment of the so-called sequence number checking circuit;

Figs. 5 to 15 disclose the circuits and equipment of the so-called automatic selection circuit; and Fig. 16 discloses the manner in which Figs. 1 to 15 may be arranged with respect to each other to form a complete system.

General description

In the embodiment of the invention shown in the drawings and described herein, provision is made for automatically switching to some seventy-three destinations, and while the system described is in conjunction with the switching of a message from a local sending position or the switching of a message in a tape prepared by a manually operated keyboard perforator at the central office, it will be apparent that the operation of the system is the same and equally applicable for switching messages in a tape prepared by a perforated mechanism responding to signals received over an incoming line or channel. Each message stored in the tape to be switched will be preceded by two selection or directing characters which determine the particular destination for the message. One of these destinations will preferably be a receiving position such as that associated with a manually directed switching system as disclosed in copending application Serial No. 37,894, filed July 9, 1948, now Patent No. 2,546,630, issued March 27, 1951. The remaining destinations will be those to which messages are automatically switched and thus messages that can not be routed to these destinations will be automatically switched to a particular receiving position.

The portion of the intra-office message transmitter circuit which actually sends the messages across the office via the intra-office circuits, is substantially identical with the intra-office transmitter circuits in the above-mentioned copending application. Also, the sending position circuits associated with the outgoing lines to which messages are automatically switched are substantially identical to the sending circuit disclosed in the above-mentioned copending application and reference is made thereto for a complete description of the operation of these circuits.

The tape issuing from the manually operated perforator, in the case of a local sending position, or the tape from a signal controlled perforator in the case of a receiving position, first passes through a so-called number checking transmitter and then an intra-office message transmitter. The number checking transmitter functions to check the sequence number of the message and the intra-office transmitter functions to transmit the message to the selected sending position. Located ahead of the number checking transmitter is a two-position tape lever arm and between the two transmitters a one-position tape lever arm. These tape lever arms operate and indicate the supply of tape available to each transmitter and control various circuits. Associated with the number checking transmitter is a sequence number indicator and a signal indicator containing various control keys and signal lamps. Associated with the intra-office message transmitter and individual thereto are three intra-office connector switches and other equipment common to a number of such message transmitters. The common equipment actually performs the automatic operations of connecting the intra-office transmitters to the intra-office circuits which terminate on the intra-office connector switches.

The number checking and the message transmitters are located as near together as practical and both are arranged to idle blank tape except when a taut tape condition exists. When a message is being prepared in the storage tape it is assumed that all of the tape ahead of the message is perforated with blanks.

As set forth, each message is preceded by two directing characters which are followed by a figures shift character and then the sequence number of the message. As the message is being perforated the tape will be stepped through the number checking transmitter which at this time is conditioned to detect a figures shift character. When such a character is detected the number checking transmitter proceeds to check the following number against the number set up in the sequence number indicator. When this is done the tape with the message therein will be stepped through the number checking transmitter until it detects the end-of-message signal and thereupon the number checking transmitter will cease stepping the tape.

Meanwhile the intra-office message transmitter will have idled the tape therethrough until the first character of the message, which will be the first of the two directing characters, appears over the transmitter pins, and when this occurs further advancement of the tape for the time being will cease.

Before the intra-office message transmitter can function to automatically switch the message there are four conditions that must exist: (1) the initial character of the message must be over the pins of the intra-office message transmitter; (2) the message sequence number must have checked with the sequence number indicator; (3) the number checking transmitter must have detected the end-of-message or double period; and (4) the contact associated with the lower position of the two-position tape lever arm must be closed to indicate a sufficiently large tape loop between the perforator and the number checking transmitter to permit the last character of the message, which is over the pins of the number checking transmitter, to advance and be cleared through the intra-office message transmitter.

The existence of the above four conditions initiates a connection of the common equipment to the circuits of the intra-office message transmitter. The common equipment consists primarily of an office call selector and control apparatus which when connected to the transmitter functions to read the two directing characters preceding the message, the first one of which is at this time over the pins of the message transmitter and establishes two control circuits; one of these circuits determines to which of three connector switches the transmitter will be connected while the second circuit determines the point to which this connector switch will step or, in other words, the particular intra-office circuit to which the message transmitter will be connected.

When connection is established to the selected intra-office circuit, the common equipment is released and is free to serve other message transmitter circuits, and the connected message transmitter seizes the desired intra-office circuit if idle or stands in readiness to seize it when it becomes idle. Upon seizure of the intra-office circuit, the intra-office message transmitter transmits the message across the office and simultaneously the number checking transmitter is restored to its idle circuit condition where it will idle tape and detect the first figures shift character of the subsequent message.

Various controls and signals are provided to indicate such conditions as failure of the message sequence number of the message to check with the number in the sequence number indicator, an automatic switch not being made due to incorrect directing characters of faulty equipment and an automatic switch being made to a closed-out sending circuit.

*Sequence number checking circuit*

The purpose of the sequence number checking circuit shown mostly on Figs. 1 to 4 is to check the message sequence number in the perforated tape against the number appearing in the sequence number indicator and then read the double period end-of-message signal. The accomplishment of these two functions will fulfill two of the four conditions outlined above that must exist before the intra-office message transmitter will operate to automatically switch a message.

For the time being it will be assumed that the tape 11 between the perforating mechanism 12, either a manually operated mechanism or a signal controlled mechanism operating in response to signals from branch office 13 over line L, and the number checking transmitter 14 contains nothing but blanks and a taut tape condition exists. Under these conditions the tape lever 16 will hold contacts 17 and 18 open.

The accumulation of tape between the perforator 12 and transmitter 14 due to the storage of a message therein permits tape lever contacts 18 to close and establish a circuit for the idling of blank tape through the transmitter. This idling of the tape continues until the first figures shift character is detected and the circuit to the step magnet SM of the tape transmitter may be traced from battery through the winding of the step magnet SM, back contacts of the second figures relay N2F, the differential coils of the transmitter auto-stop relay NXA, associated continuity contacts 19, another pair of back contacts of relay N2F, and through sixth pulse contacts 21 to ground. The sixth pulse contacts 21 operate in conjunction with so-called probing pulse contacts 22 and relay pulse contacts 23 operating in timed relation in the manner indicated. Thus each closing of the sixth pulse contacts 21 advances the tape 11 through the transmitter 14 and after each such step pulse relay contacts 23 close to apply ground through back contacts of relay NXA to the marking bus bar of the tape transmitter 14. The tongues of the transmitter are connected through the coils of individual number check pulse relays N1P to N5P to battery. Accordingly the number check pulse relays are operated in combinations representing the markingly positioned tongues of the transmitter.

The probing pulse contacts 22, which close during the closure of the relay pulse contacts 23 and when each character is stepped into the transmitter, is utilized at this time to detect the figures shift character. A figures shift character consists of the first, second, fourth and fifth pulses marking and the stepping of such a character into the transmitter 14 causes operation of corresponding ones of the number check pulse relays N1P to N5P. The operation of the number check pulse relays in a figures shift combination establishes a circuit for the operation of the first figures relay N1F. This circuit extends from ground through the probing pulse contacts 22, back contacts of relays NXA, the check finish NCF, front contacts of relays N1P and N2P, a common multiple, through the fourth level of the hundreds, tens and units switches 28, 27 and 26, respectively, of the hereinafter described sequence number indicator, point 1 and wiper of the third level of the director switch 24 of the said sequence number indicator, back contacts of relay N3P, front contacts of relays N4P and N5P, back contacts of relay N2F and through the coil of relay N1F to battery.

The operation of relay N1F establishes a circuit from ground through point 1 and wiper of the second level of the director switch 24 to operate the digit correct relay NDC which locks up through its locking coil the interrupter springs of the director switch and its own contacts to ground. Relay N2F operates upon the opening of the probing pulse contacts 22 and functions to transfer the sixth pulse circuit to the step pulse relay NSP. Upon closure of the sixth pulse contacts 21 relay NSP operates and locks up directly to the sixth pulse contacts and energizes the step magnet SM of the number check transmitter 14 and director switch. As the sixth pulse contact 21 opens, relay NSP releases whereupon the figures shift character is stepped out of the transmitter 14 and the director switch steps to point 2 in readiness to check the thousands digit of the sequence number of the message in tape 11. The opening of the interrupter springs on the director switch as its step magnet SM is energized breaks the locking circuit on relay NDC.

The circuit is now in readiness to determine whether the character now in the number checking transmitter 14 corresponds to the thousands digit appearing in the sequence number indicator. The sequence number indicator includes the above-mentioned three-level rotary director switch 24, three four-level rotary switches designated units, tens, and hundreds 26, 27 and 28, respectively, and a reset key 29. The units, tens and hundreds switches are equipped with numbered dials 31, 32 and 33, respectively, which advance one position for each step of a respective switch. The cover 34 of the dials has openings such as 36 through which one number, or blank space, on the dials 31 to 33 may be observed. The numbers thus observed in the openings 36 visually indicate the correct sequence number for the message being checked.

A check is not made for zero fill-in digits ahead of the message sequence number inasmuch as such characters are not used in sequence numbers and would not appear in the perforated tape. Accordingly, when the thousands, hundreds or tens portion of the sequence number indicator is in the "no digit" position, no visual indication is given on the associated sequence numbered dial, and the associated points on the thousands, hundreds and tens switch levels are connected to one of the terminals of the right hand coil of no-digit relay NND. At this time the other terminal of this coil of relay NND is grounded through front contacts of relay N2F. When the director switch 24 connects the digit correct relay NDC to the thousands circuit, which is the second point on the second level, relay NDC will operate if this point is connected to the "no-digit" relay NND, or it will be connected to the baffle circuit of the contacts of relays in N1P to N5P if the sequence number indicator indicates a thousands digit.

For the time being let it be assumed that no digit is indicated and therefore the digit correct relay NDC will operate by a circuit through its left hand coil in series with the right hand coil of relay NND. As relay NND operates, it opens the locking circuit through the left hand coil of relay NDC and also the circuit to the step magnet SM of transmitter 14 so that the character then in the transmitter will not be advanced but held there for checking as the hundreds digit. The subsequent closing of the sixth pulse contacts 21 completes a circuit through the coil of the step pulse relay NSP which operates and steps the director switch 24 to its third point where it is conditioned to check the hundreds digit. The advancement of the wipers of the director switch 24 from a second point to the third opens the circuit to relay NDC whereupon it releases.

If no hundreds digit is indicated in the sequence indicator, relay NDC will operate again in series with relay NND and the latter will again open the circuit to the step magnet SM of the transmitter so that the character over the pins in the transmitter will be held there for checking as a tens digit. The subsequent closure of the sixth pulse contacts 21 again operates the step pulse relay NSP to cause the director switch to step to point 4 in condition to check the tens digit. If there is no tens digit indicated in a sequence number indicator, the "no digit" relay NND will again operate in series with relay NND and the latter will again open the step pulse circuit to the step magnet SM and the character in the transmitter will be held for checking as a units digit. On the subsequent closure of the sixth pulse contacts 21, relay NSP operates to step the director switch 24 to point 5 in readiness to check the number in the tape over the pins of the transmitter 14 against the units number indicated in the sequence number indicator.

Before describing the operation of the sequence number indicator in checking a units digit only, the operation thereof will be set forth in connection with the checking of a four-digit number and for the time being it will be assumed that the number in both the tape 11 and the sequence number indicator is 1234. In this case the director switch 24 will be advanced as above set forth and when it connects relay NDC to the thousands circuit or point 2 on the second level thereof, a circiut is prepared for relay NDC to operate through the second wiper and a point 12 of the hundreds switch, back contacts of the left hand tongue of the check finish relay NCF, front contacts of the inner tongue of relay N5P, back contacts of the second tongue of relay N4P, front contacts of the second tongue of relay N3P, the third wiper and second point of the director switch 24, through a common multiple on the fourth level of the units, tens and hundreds switches, front contacts of the second tongues of relays N2P and N1P, back contacts of the outer left hand tongues of relays NCF and NXA to ground through the probing pulse contacts 22. The above circuit is contingent upon the relays N1P to N15P being operated in accordance with the first digit or figure 1, and the subsequent closing of the probing pulse contacts 22 operates relay NDC which locks up through its left hand coil, the interrupter springs associated with the step magnet of the director switch, front contacts of the first figures relay N1F, the back contact and left hand tongue of relay NND, the front contact and fourth right hand tongue of relay N1F to ground through the right hand tongue and front contact of relay NDC. As relay NDC operates, it prepares a circuit from the sixth pulse contacts 21 through the coil of relay NSP and the subsequent closure of these contacts causes relay NSP to operate and completes circuits for the energization of the step magnets SM of the transmitter 14 and the director switch 24. The operation of the step magnet of the latter switch through its interrupter springs opens the locking circuit through the right hand coil of relay NDC. As relay NSP releases at the end of the sixth pulse the second digit or figure 2 of the sequence number is stepped into the tape transmitter and the director switch 24 is stepped to its third point in readiness to compare the hundreds circuit in the sequence number indicator with the figure 2 in the perforator tape.

Figure 2:
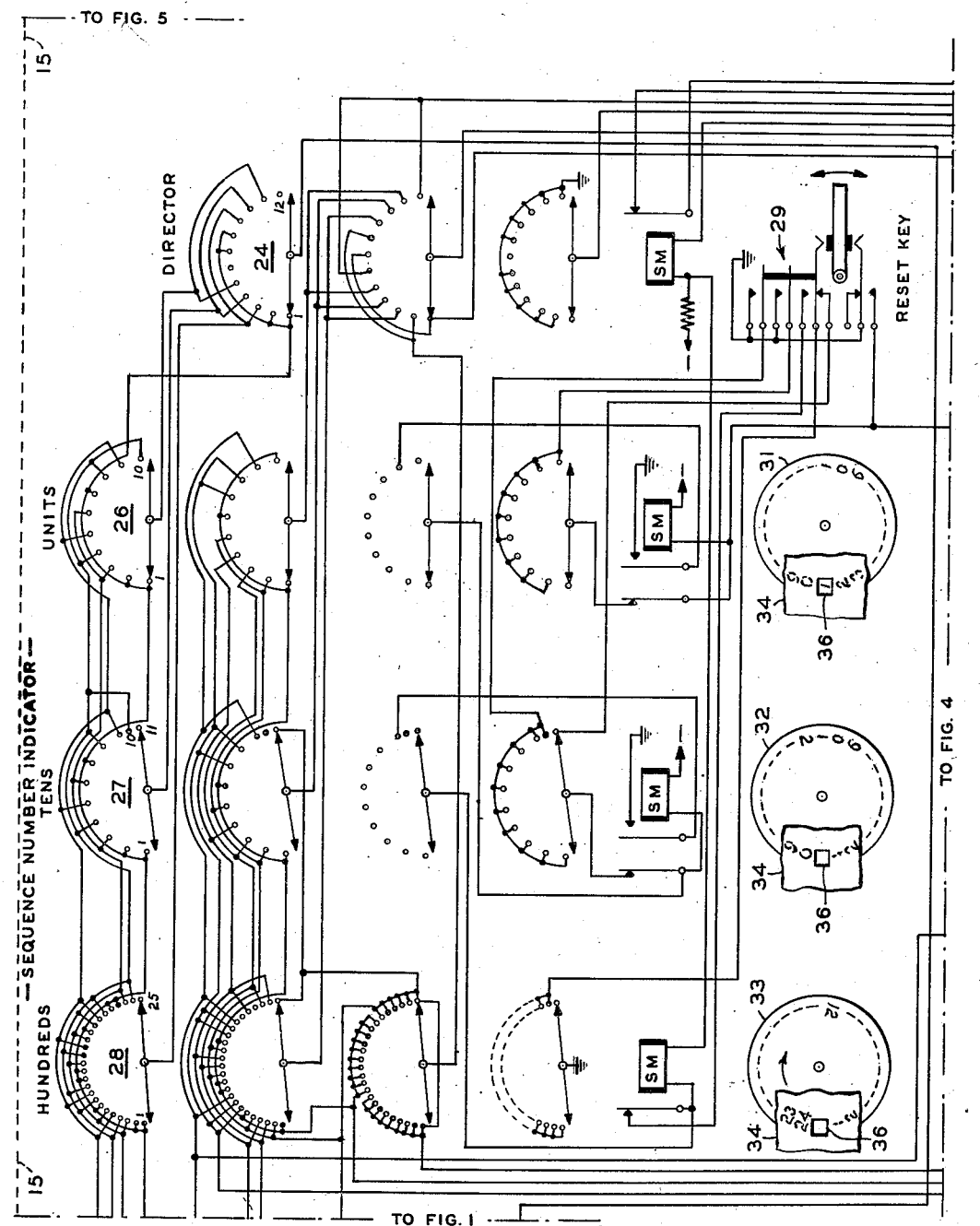
Figure 3:
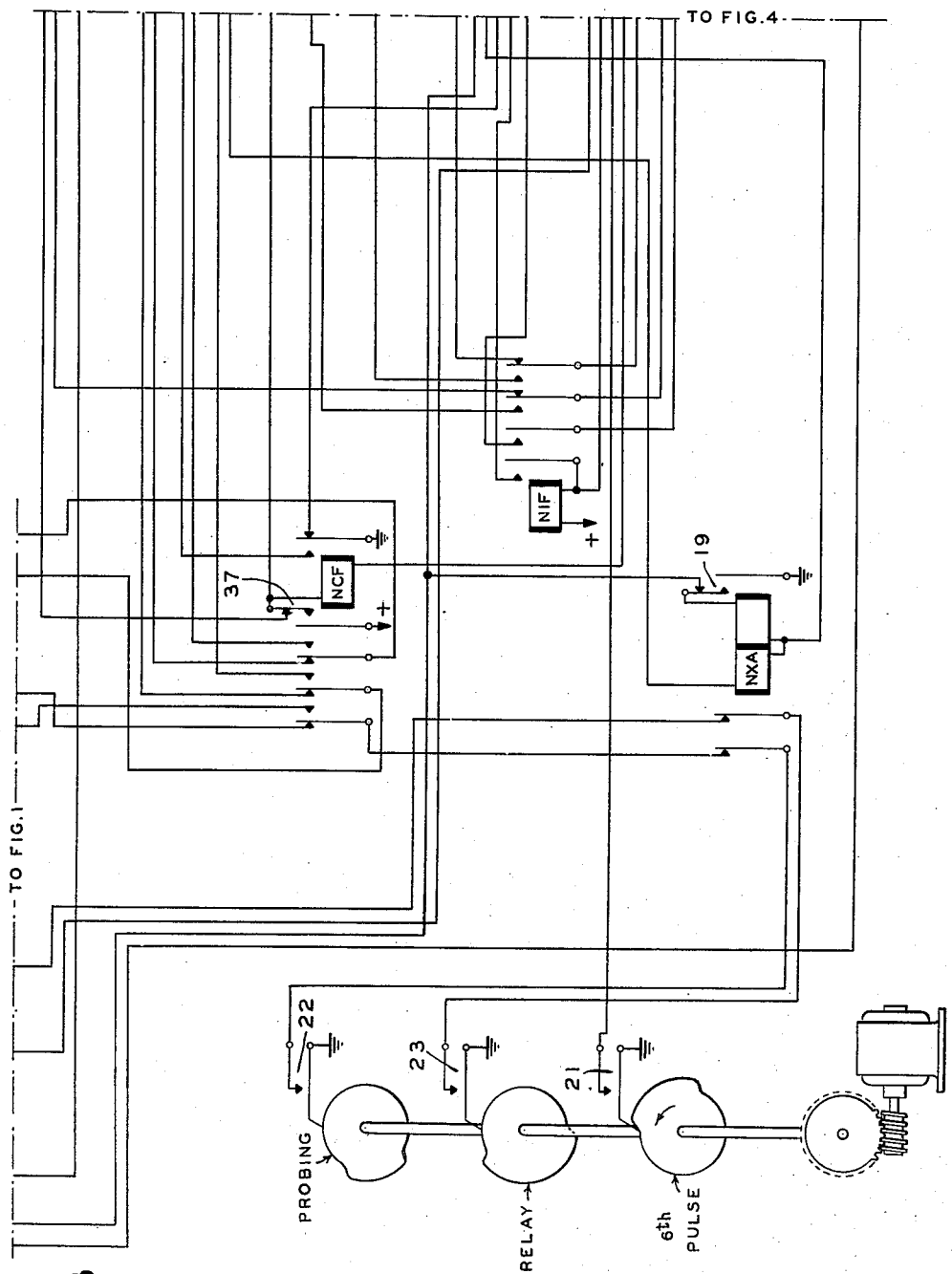
Figure 4:
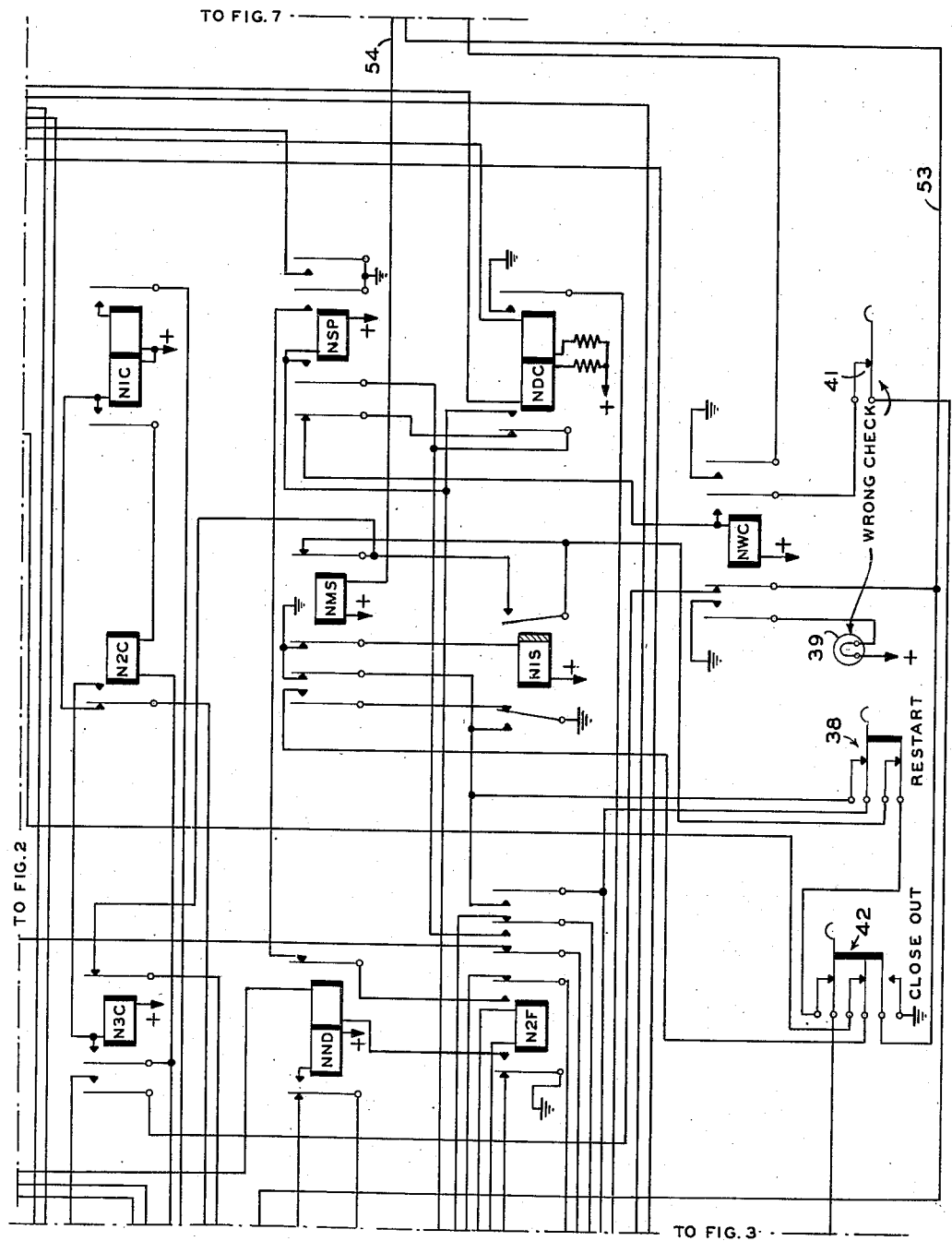

The subsequent closing of the probing pulse contacts 22 after the stepping of figure 2 into the transmitter will again operate relay NDC by a circuit through the second wiper and third point of the director switch 24, the third wiper and twelfth point of the hundreds switch 28, the front contact and outer tongue of relay N5P, the back contact and outer tongue of relay N4P, the back contact and outer tongue of relay N3P, the third wiper and third point on the director switch, the fourth wiper and twelfth point on the hundreds switch, the front contact and second tongue of relay N2P, the front contact and outer tongue of relay N1P, the back contact and outer left hand tongue on the check finish relay NCF, the back contact and outer left hand tongue of relay NXA to ground through the probing pulse contacts 22. At this time the relays N1P to N5P are operated in accordance with the figure 2 and the operation of relay NDC by the above circuit indicates that the digit in the transmitter and the one indicated in the sequence number indicator correspond. The subsequent closure of the sixth pulse contacts 21 effects operation of relay NSP to again step the director switch 24, this time to its fourth point and the energization of the step magnet SM of transmitter 14 to advance the figure 3 into registry with the sensing pins. The director switch is now conditioned to check the tens digit, figure 3 in the sequence number indicator, against the figure 3 in the perforated tape.

Under these conditions the subsequent closure of the probing pulse contacts 22 operates the digit correct relay NDC by a circuit through the second wiper and fourth point of the director switch 24, third wiper and third point of the tens switch 27, back contacts and outer tongues of relays N5P, N4P and N3P, the third wiper and fourth point of the director switch, the fourth wiper and third point of the tens switch, the back contact and second tongue of relay N2P, the front contact and second tongue of relay N1P through back contacts of relays NCF and NXA with the probing pulse contacts 22. The completion of this circuit indicates the correct comparison between the number in the tape over the pins of the transmitter and that in the sequence number indicator, namely, the figure 3. Since the two figures check, the subsequent closure of the sixth pulse contacts 21 again operates relay NSP to advance the director switch 24 to point 5 and the stepping of figure 4 in the tape into registry with the pins of the transmitter 14 in readiness to check this figure against the units digit 4 in the sequence number indicator.

Under these conditions the subsequent closure of the probing pulse contacts 22 completes a circuit for again operating relay NDC which may be traced from potential, through the left hand coil of relay NDC, the second wiper and point 5 of the director switch, the third wiper and point 4 of the units switch 26, the back contact and second tongue of relay N5P, the front contact and third tongue of relay N4P, the back contact and second tongue of relay N3P, the third wiper and point 5 of the director switch, the fourth wiper and point 4 of the units switch, the front contact and third tongue of relay N2P, the back contact and second tongue of relay N1P and back contacts of relays NCF and NXA to ground at the probing pulse contact. The completion of this circuit indicates that the number in the tape checks with the number in the sequence indicator and the subsequent closing of the sixth pulse contacts 21 again energizes relay NSP to step the director switch to its sixth point and the stepping of digit 4 in the tape out of the transmitter. As the director switch steps to its sixth point a circuit is completed for the operation of the check finish relay NCF through the right hand coil of relay NDC, the second wiper and point 6 of the director switch, the continuity contacts 37 and coil of relay NCF, upper contacts of restart key 38 to ground through the second left hand tongue and back contact of message switched relay NMS. As relay NCF operates, it locks up to battery on its inner left hand tongue and through contacts 37 opens the circuit through the coil of relay NDC.

*Wrong check*

Had any of the numbers in the tape 11 failed to check with the numbers set up in the sequence number indicator, a wrong check lamp 39 would have been lighted and in order to illustrate the operation of the circuits at such time let it be assumed that the sequence number indicator has the number 1234 set up therein and the number 1235 appeared in the tape 11. As set forth, the digits 1, 2 and 3 will check and thereafter the director switch 24 will be on point 5 in readiness to compare the units figure 4 in the sequence indicator with the units figure 5 in the tape.

Figure 5:
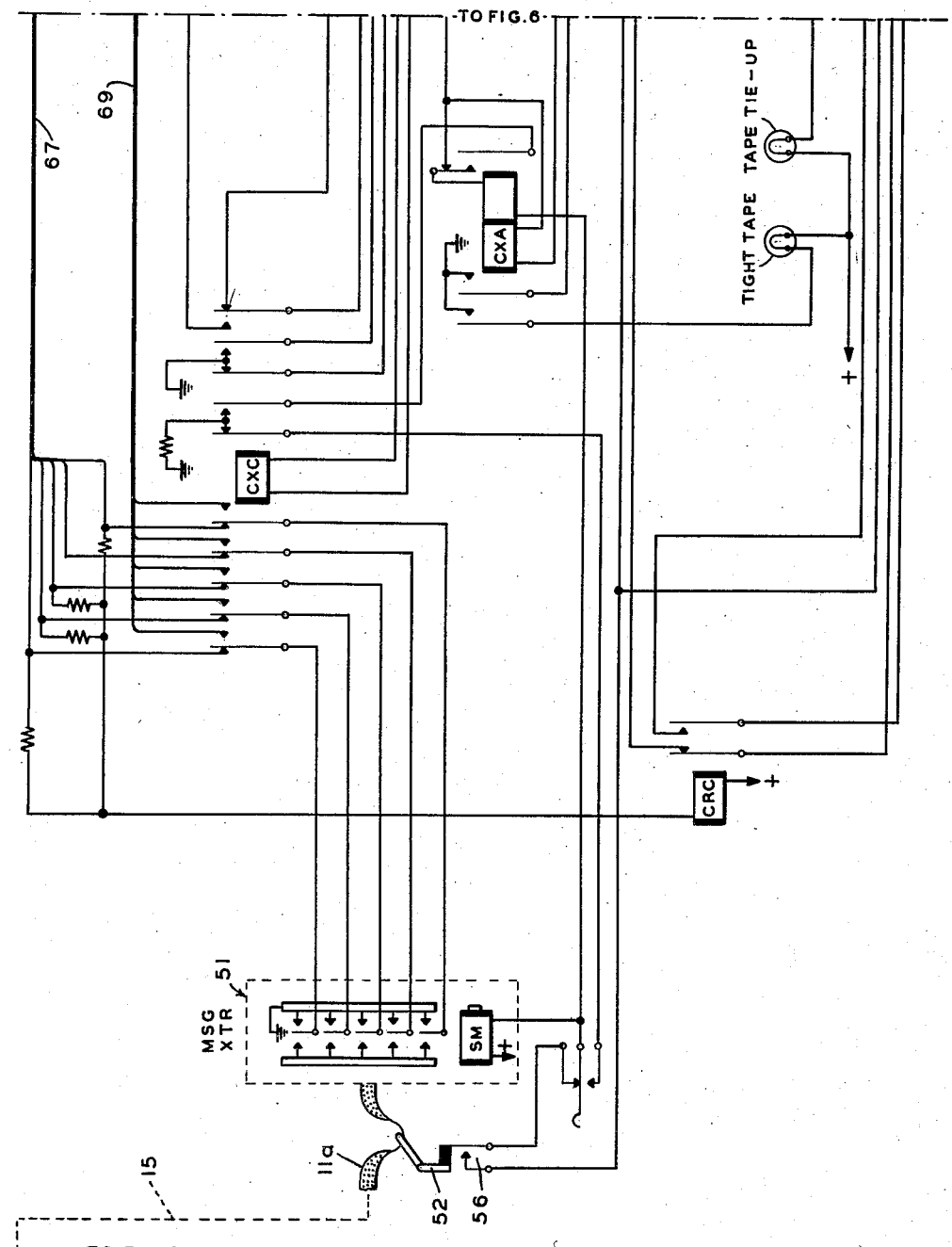
Figure 6:
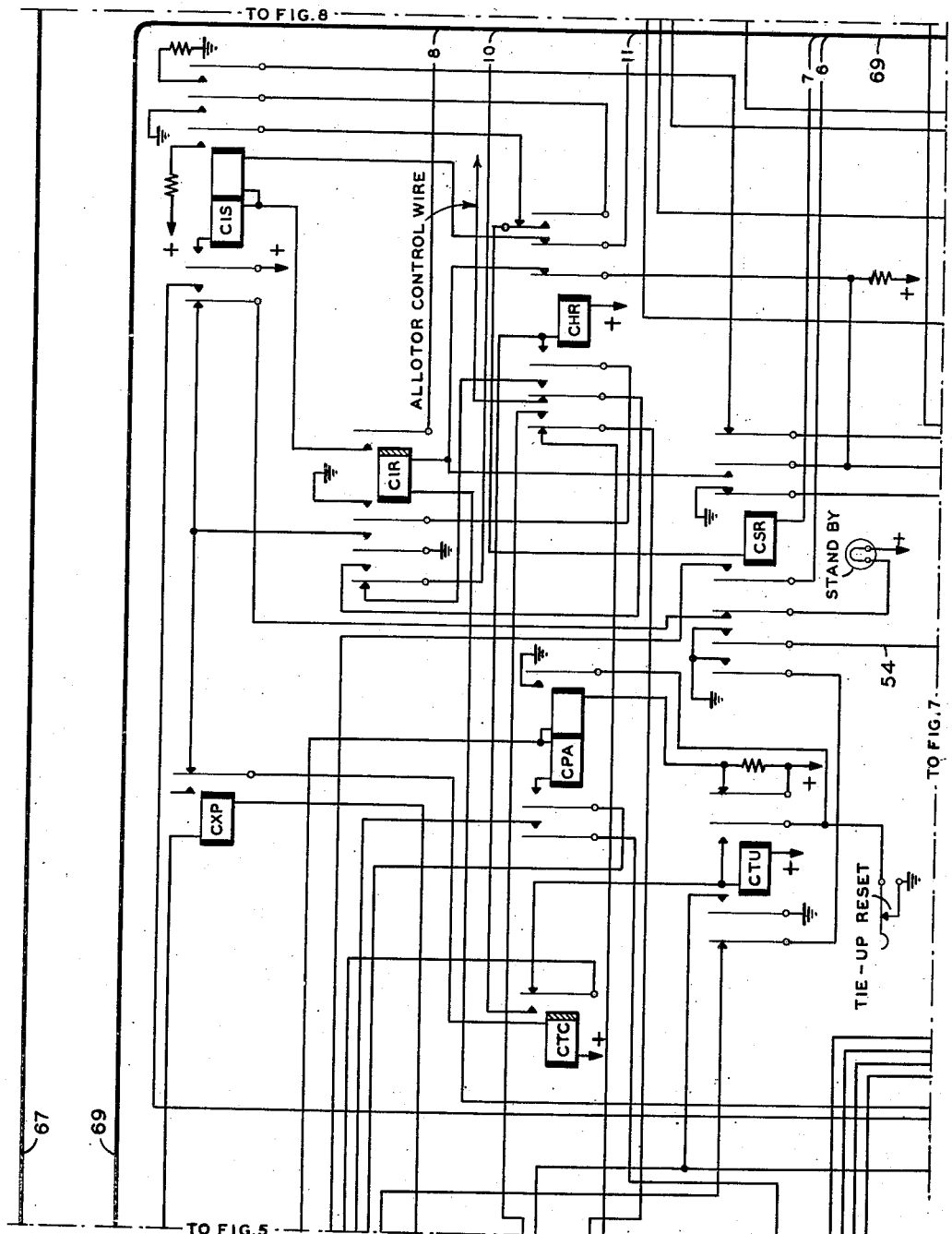
Figure 7:
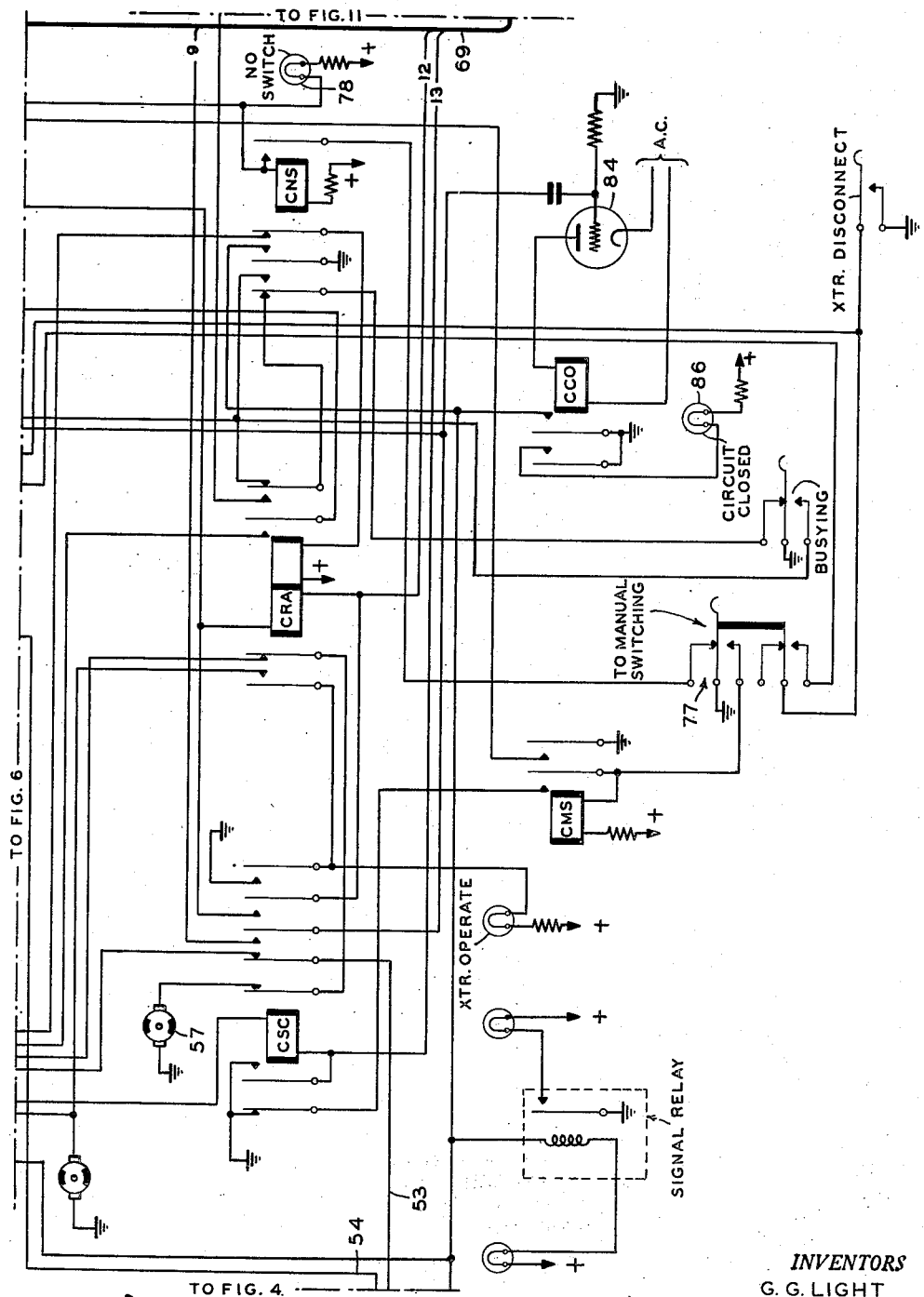
Figure 8:
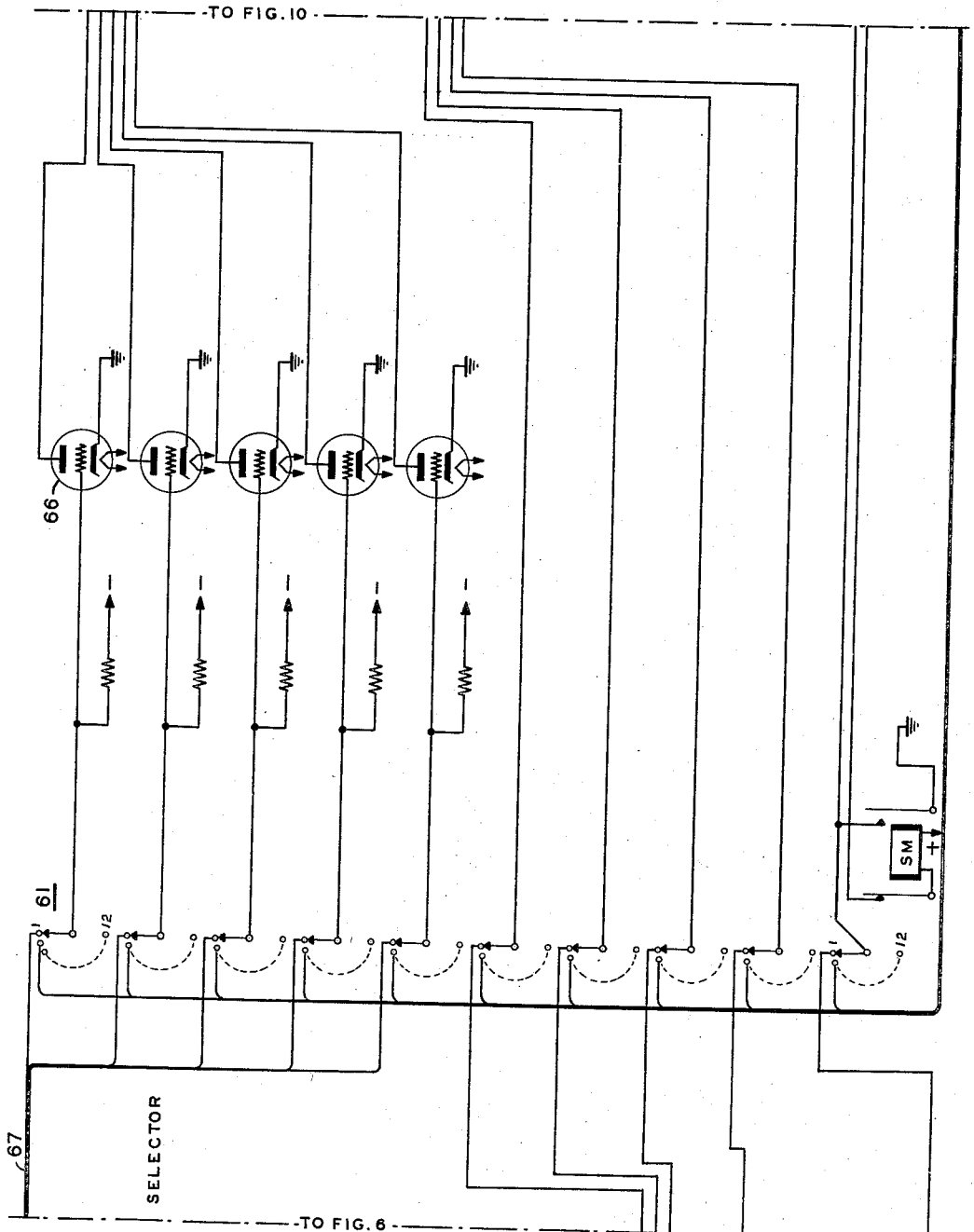

When figure 5 is in the transmitter 14, relays N1P to N4P will be deenergized and only relay N5P energized. Following the stepping of this figure 5 into the transmitter, the closing of the probing pulse contacts 22 will not complete a circuit for the operation of relay NDC since the circuit therefor will be open at the contacts of relay N5P. With relay NDC unoperated, the subsequent closure of the sixth pulse contacts 21 will complete a circuit for the operation of the wrong check relay NWC by a circuit from battery through the coil of this relay, the back contact and outer left hand tongue of relay NSP, the back contact and left hand tongue of relay NDC, the front contact and third right hand tongue of relay N2F and through the sixth pulse contacts 21 to ground. When relay NWC operates, it locks up by a circuit through its front contact and inner right hand tongue, the wrong check key 41, the coil of relay NCF, the upper contacts of the restart key 38 to ground through the second left hand tongue and back contact of relay NMS. Relay NCF is also thus operated and relay NWC in operating completes a circuit for the operation of the wrong check lamp 39 and by its inner left hand tongue opens the circuit employed in initiating the automatic switch.

It will be noted in the above described operations that relay NCF operated and locked up at the end of the number checking operation when all digits of the sequence number in the tape checked with those set up in the sequence number indicator and that relay NCF operated and locked up immediately when any of the digits failed to check. In either case the operation of relay NCF through its right hand tongue opens the circuit to relays N2F and N1F allowing these relays to release and through its outer left hand tongue, relay NCF transfers the circuit from the probing pulse contacts 22 to the period reading circuit comprising mainly the inner tongues of relays N1P to N5P and through its second and third left hand tongues completes the period reading circuit to the first, second and third counting relays N1C, N2C and N3C. The circuits are now arranged for the operation of relay NCF even though the number fails to check so that the tape will continue to advance until the end of the message in order that there will be a sufficient amount of tape for the preceding message to clear through the intra-office message transmitter.

When the circuit through the coil of relay N2F is interrupted, as set forth above through the operation of relay NCF, its first and third right hand tongues reestablish the circuit from the step magnet SM of the transmitter through the differential coils of relay NXA to the sixth pulse contacts 21, whereby the stepping of the tape is again under control of the tape lever contacts 18. As relay N1F releases, its third right hand tongue establishes a circuit from battery through the left hand coil of relay NDC, the interrupter springs of the director switch 24 and the first wiper thereof to ground, thus causing relay NDC to operate. As relay NDC operates it applies ground to a circuit including its right hand tongue and front contact, back contacts of relay N1F and the coil of relay NSP which causes the latter relay to operate. As relay NSP operates it energizes the step magnet of the director switch whereupon the interrupter springs open the circuit to relay NDC which releases and opens the circuit to relay NCP. As relay NCP releases, the director switch advances one step and these operations continue until the wipers of the lower level of the director switch reach an ungrounded point on one of its home positions such as 1 or 7 where the absence of ground will prevent further operation of relay NDC.

*Detection of end of message in number check transmitter*

When the circuit is reestablished for the periodic energization of the step magnet SM of the transmitter 14 from the sixth pulse contacts 21, the tape will continue to be advanced until a period is stepped into the transmitter. Such characters operate only relay N4P of the pulse relays N1P to N5P and the subsequent closing of the probing pulse contacts 22 completes a circuit for the operation of relay N1C. This circuit may be traced from ground, probing pulse contacts 22, back contacts of relay NXA, the outer left hand tongue and front contact of relay NCF, the inner tongue and back contacts of relays N1P to N3P, the inner tongue and front contact of relay N4P, the inner tongue and back contact of relay N5P, the third left hand tongue and front contact of relay NCF, back contacts of relay N2C and through the left hand coil of relay N1C to potential. Relay N1C is thereby operated and when the probing pulse contacts 22 open, N2C will operate by a circuit through the coil thereof and the front contact and right hand tongue of relay NCF to ground.

If the first period is followed by any character other than another period, the closing of the probing pulse contacts 22 while this other character is in the transmitter will complete a circuit through the front contact of the inner tongues of relays N1P, N2P, N3P, N5P, or through the inner tongue and back contact of relay N4P, the second left hand tongue and front contact of relay NCF, through the right hand coil of relay N1C to battery. The right and left hand coils of relay N1C are in opposition and the completion of the above circuit will release relay N1C. As relay N1C releases, it opens the locking circuit N2C which also releases.

When a second period directly follows a first, the circuit from the probing pulse contacts 22 completed through the period reading circuit of the contacts of relays N1P to N5P and a front contact of relay NCF to the tongue of relay N2C, is extended by the operation of the latter relay through the coil of relay NC3 to potential. Accordingly, the appearance of a second period immediately following a first will cause relay N3C to operate when the probing pulse contacts 22 close. As relay NC3 operates it locks up by a circuit including its inner left hand tongue and the inner right hand tongue of relay NCF; through its right hand tongue it opens the circuit through the left hand coil of relay NXA so that the latter will operate to stop further tape stepping in the transmitter; and by its outer left hand tongue partially prepares a circuit from ground through auxiliary tape lever contact 17 for initiating the automatic switch of the message.

As set forth there are four conditions which must be fulfilled before the message switching operating can be initiated. Two of these conditions, namely, the checking of the message sequence number in the tape with the number appearing in the sequence number indicator and the detection of the double period end-of-message signal by the tape transmitter 14, have been fulfilled in the above-described operation and it will be assumed that the tape loop between the perforator 12 and number check transmitter 14 is sufficient to permit the lower or auxiliary tape lever contact 17 of the two position tape lever arm to close. This completes the third requirement and for the time being it will be further assumed that the first character of the message is over the pins of the intraoffice message transmitter 51. The message transmitter 51 is similar to the number check transmitter and normally these two transmitters would be placed as close to each other as practical while permitting a tape lever arm 52 to operate on the tape loop formed between the two transmitters. In order to simplify the drawings as much as possible the two tape transmitters are shown separated and it will be understood that the tape 11a emerging from transmitters 14 is continuous as indicated by the dotted line 15 and enters the left hand side of the message transmitter 51.

When the first character of the message appears over the pins of the message transmitter 51, which character will be one of the selecting or directing characters, relay CRC will be operated, it being understood that the message transmitter is arranged to idle the blank or message separating characters therethrough. At this time a circuit is now established for the operation of the request automatic switch relay CRA, the circuit therefore being from battery through its right hand coil, back contacts of the "no switch" relay CNS, front contacts of relay CRC, back contacts of the switch completed relay CSC, all in the circuit of the intraoffice message transmitters comprising mainly Figs. 5 to 15, over conductor 53, back contacts of relay NWC, front contacts of relay N3C and through the auxiliary tape lever contact 17 to ground. For the time being it will be assumed that the intraoffice message transmitter has been connected to the selected intraoffice circuit resulting in the operation of the message transmitter seize relay CSR. The operation of the latter relay supplies a ground through its left hand tongue to conductor 54 which extends through relay MNS to battery so that the latter relay will also be operated at this time.

As relay NMS operates, it opens the circuit to normally operated slow-to-release indicator step relay NIS, applies a ground to the step magnet SM of the units switch in the sequence numbering indicator; opens the locking circuit for relay NCF permitting it to release, and keeps the circuit through the left hand coil of relay NXA open so that the tape transmitter 14 can not at this time resume its stepping operation.

As relay NCF releases, it causes relays NIC, N2C and N3C to release, and reestablishes the circuit for detecting the first figure shift character in the following message. When relay NIS thereafter releases, it removes ground from the circuit of the step magnet of the units switch 26 whereby it is advanced one step, and also reapplies ground for the locking circuit of relay NCF and reestablishes through its right hand tongue and back contact the circuit to the left hand coil of relay NXA.

At this time all relays with the exception of relays NMS and NXA are released and provided the tape lever contacts 18 are not open due to taut tape, relay NXA will release on the subsequent closing of the sixth pulse contacts 21. This reestablishes the tape stepping circuit for advancing the tape 11 through the number checking transmitter 14 until the first figure shift character in the following message is detected.

As set forth, the operation of the wrong check relay NWC lights the wrong check lamp 39 and prevents the initiation of an automatic switching operation. However, if it is desired to switch the message automatically even though the message sequence number is incorrect, the operation of the wrong check key 41 to open the locking circuit for relay NWC will permit the switching of the message. The release of relay NWC through its inner left hand tongue closes the initiating circuit including conductor 53.

In the event that it is desired to move the tape back in the number checking transmitter 14 and repeat the sequence number checking operation, the operation of the restart key 38 restores all relays of the checking circuit to their idle circuit condition. This actuation of this key opens the locking circuit to relay NCF, permitting it to release, and opens the circuit to the left hand coil of relay NXA to stop the tape stepping operation.

The sequence number checking circuit includes a close-out key 42 and its operation renders the checking circuit inoperative and allows messages to be automatically switched from the associated intraoffice message transmitter such as 51 without the necessity of completing the initiating circuit through the checking circuit. When the close-out key is operated, the circuit to the left hand coil of relay NXA is opened to stop the number checking transmitter from stepping, the step circuit to the sequence number indicator is opened, and a ground is applied to the initiating circuit 53 for an automatic switch.

The reset key 29 in the sequence number indicator when pushed in one direction enables the sequence number in the indicator to advance one number and when operated in the other direction resets the indicator to its home position, where the digit 1 is indicated.

*Intraoffice message transmitter and automatic selection circuits*

One of the four enumerated conditions that must exist before a message in the tape 11 can be automatically switched is for the first character of this message to be over the pins of the message transmitter 51. This transmitter idles blank tape except when a taut tape condition exists, and also idles period characters when in an idle circuit condition in order that a third period which might inadvertently be inserted in the message termination will not register as the first character of the succeeding message. The stepping circuit for the idling operation is from battery through the step magnet SM of transmitter 51, tape lever contacts 56, back contacts of the holding relay CHR, the request connection relay CRC, the request automatic switch relay CRA and the switch completed relay CSC to ground at impulse unit 57. When any character other than a blank or period is stepped into the transmitter 51, one or more of the first, second, third or fifth tongues thereof will be grounded on the marking bus bar and complete a circuit through one or more tongues and back contacts of the transmitter connect relay CXC for the operation of relay CRC. The operation of the latter relay opens a stepping circuit and thereby this character is retained over the pins of the transmitter.

At this time the only remaining condition that must exist before the automatic switching operation can be initiated is for the lower or auxiliary contact 17 to be closed to indicate that a sufficiently large tape loop exists ahead of the number check transmitter 14 to permit the last character of the message ahead of the message transmitter to pass through the message transmitter before a taut tape condition can occur and open tape lever contacts 56. With auxiliary tape lever contacts 17 closed, a circuit is established from ground through contacts of relays N3C and NWC to conductor 53, and at the message transmitter circuit this circuit is continued through a back contact of relay CSC, a front contact of relay CRC, a back contact of the no-switch relay CNS, and through the right hand coil of the request automatic switch relay CRA to potential.

The equipment which actually makes the automatic switch is common to a plurality of message transmitting circuits such as that including transmitter 51 and the operation of relay CRC makes a request for a connection to this common equipment. As relay CRC operates, its outer right hand tongue removes ground from the lower or marking level of a ten level automatic switching selector switch 61 and applies this ground to a common start circuit for the operation of the automatic start relay ASR. The latter relay ASR can be operated from any one of the intraoffice message transmitter circuits that is in condition to make an automatic switch.

As relay ASR operates it causes the selector switch 61 to self-step until it finds the ungrounded point on its lower marking level associated with the transmitter circuit requesting an automatic switch. The self-stepping circuit of the step magnet SM of switch 61 includes the associated interrupter contacts and contacts of relay ASR and of the automatic circuit connect relay ACC. When the wiper of the marking level reaches the marked point, relay ACC will operate and reduce the current through the step magnet to a value below that necessary to operate the step magnet.

Included in the automatic selection circuit is a so-called three-level director switch 62 which causes the proper sequence of operations to take place for making an automatic switch. As relay ACC operates its third right hand tongue applies a pulsing circuit from pulsing unit 63 to the No. 1 point on the right hand level of the director switch 62 and the first pulse that occurs thereafter will step the director switch to its second point. Thereupon the director switch is under control of the pulsing unit 63 and it will continue to step until it reaches its seventh point. It will remain on the seventh point until after the automatic switch has taken place and relay ACC becomes deenergized. At that time the application of the pulsing circuit to the seventh point will step the switch to its eighth point after which it will be stepped directly from the pulsing unit 63 one more step, coming to rest on point 9, a home position.

The operation of relay ASR prepares an alarm circuit including two normally operated slow-to-release switch tie-up relay AST and the switch tie-up control relay ASTC. When relay ASR operates relay ASTC is short-circuited to ground through the first point on the middle level of director switch 62. About one-third of a second thereafter relay ASTC releases and short-circuits relay AST. If the selector switch 61 has not completed its stepping operation and relay ACC has not caused the director switch 62 to step off its first point, the short-circuit will remain on relay AST and cause it to release. The release of the latter relay completes a circuit through the switch tie-up lamp 64 causing it to light, indicating to the attendant a switch tie-up.

When the selector switch 61 steps the marked point representing the message transmitter requesting an intraoffice connection, the grids of five vacuum tubes 66 are connected by individual conductors of cable 67 through back contacts of relay CXC to the tongues of the message transmitter 51. The vacuum tubes 66 are arranged so that they will draw plate current if the respective tongue of the transmitter is marking and will not draw plate current when the tongue is spacing. Accordingly, the tubes 66 will be either passing plate current or not in accordance with the first selecting character of the message now over the pins of the message transmitter 51.

The director switch 62 which directs the operation causing the message transmitter to be connected to the proper intraoffice circuit in stepping to its No. 2 point completes a circuit through the left hand level thereof for the operation of relay 1LP. As relay 1LP operates, it connects the plates of the five vacuum tubes 66 through the coils of relays 1L1, 2, 3, 4 and 5, to potential and the relays connected to the tubes passing plate current will be operated and the others not operated. Thus the first directing character of the message will be registered in the five 1L relays. As the director switch steps to its third point, it will release relay 1LP and complete a circuit through its left hand level with the operation of A6P which in operating applies a ground through the wiper of the sixth level from the top of the selecting switch 61 and through a front contact of relay CRA to the step magnet SM of the message transmitter 51. This energizes the step magnet and when the director switch steps to its fourth point, relay A6P releases whereupon the circuit to the step magnet is opened and the step magnet in releasing advances the second selection or directing character over the pins of the transmitter 51.

When the director switch 62 steps to its fifth point, a circuit is completed through its left hand level for the operation of relay 2LP. This relay in operating connects the coils of relays 2L1, 2, 3, 4 and 5, to the plates of the vacuum tubes 66 and these relays are operated or not in accordance with the second directing character now over the pins of the transmitter. Thus the second character is stored in relays 2L and like the operated ones of relays 1L, the operated 2L relays are locked up to ground through contacts of relay ACC. The director switch 62 in advancing to its sixth and seventh points operates and releases relay A6P to energize and release the step magnet SM and cause the second selection character to be stepped through the transmitter and the character now over the pins thereof will be the first character to be transmitted into the selected intraoffice circuit. The director switch 62 will remain on the seventh point until the message transmitter has been connected to the intraoffice circuit determined by the two selection characters at this time stored on the 1L and 2L relays.

*Automatic switching equipment and operation*

The automatic switching is accomplished by three ten-level connector switches designated A, B and C, and the nine wires comprising cable 69 from the message transmitter circuit are connected to the wipers of connector switch A. The twenty-three points of the upper nine levels of this switch and the twenty-five points on the other nine levels of connector switches A and B connect by means of cable 71 to some seventy-three intraoffice circuits. The twenty-fourth and twenty-fifth sets of points on the upper nine levels of connector switch A extend the wipers of connector switches B and C respectively.

The selection characters may be the actual call letters of the destination represented by the intraoffice circuits and accordingly the same directing characters can be employed in any central office provided the control or office call relays are suitably wired. Offices having only one call letter are preceded by a predetermined character such as the equals sign and an office having the call letter A would be selected by the selection characters =A.

An office call selector comprising a plurality of office call relays operates in response to the stored selection characters to connect the intraoffice transmitter to the desired intraoffice circuit. The office call selector is arranged so that the directing characters will operate one or more office call relays and some of the office call relays are operated by two characters. For example, either the character A or B will operate office call relay AB. The office call relays are selected for operation through the contacts of a fan circuit employing tongues and contacts of the 1L1 to 1L5 relays arranged so that for any setting thereof any one of some twenty-six circuits can be established. The 2L1 to 2L5 relays in which are stored the second selection characters control a similar fan circuit for selecting any one of some other twenty-six circuits. It will be noted that there are two sets of 2L relays, the second set comprising only four, 2LA1 to 2LA4, operating directly off contacts of the first set. From the contacts of the two sets of 2L relays there will be two circuits to which a ground is applied and these circuits are shown connected to the two tongues on the AB office call relay. The two associated front contacts of this relay are connected through the tip and sleeve springs of a jack, such as No. 21, the tip wire of which is connected to a corresponding point on the marking level of the A intraoffice connector switch. The sleeve spring of this jack is multipled to jacks 1 to 25, inclusive, and to relay AOA. With the circuit just described, assuming the selection characters are BV for example, the office call relay AB will be operated when the director switch 62 steps to its seventh point, and this relay in operating will extend a ground to the No. 21 point on the marking level of connector switch A to relay AOA which indicates that the desired destination is located on connector switch A.

When the selector switch 61 makes connection to the intraoffice transmitter, a circuit is established through its seventh level from the top which operates a relay such as AL there being such a relay for each of the intraoffice circuits served through the common selector equipment. This circuit extends from battery through the coil of relay A1, the left hand coil of relay CRA, the seventh level of selector switch 61 to ground through a front contact and tongue of relay ACC. The coil of relay CRC in the above circuit is shunted when relay CSC operates. As relay AL operates, it indicates to the automatic switching equipment that the A, B or C intraoffice connector switches associated with the transmitter 51 should function to set up the desired connection.

Thus with relays AOA and A1 operated, a circuit is completed which causes the A connector switch to automatically step and search for the grounded point on its marking level, in this case point 21. Relay AOA in operating completes a circuit through the tongue and back contact of relay APA to the step magnet SM of switch A and as the magnet is energized its interrupter springs close a circuit through the right hand coil of relay APA which operates and opens the step magnet circuit whereupon it deenergizes and advances the wipers. This stepping of switch A continues until the grounded twenty-first point is reached whereupon a circuit is established from this grounded point through front contacts of relays A1 and AOA, the coil of relay ACA, and the left hand winding of relay APA to battery. This circuit operates relay APA and prevents the switch from further stepping. Relay ACA in operating indicates that the switch has found its marked point.

As relay ACA operates a circuit in established from ground on a tongue of relay AOB, through a back contact of relay AOC, the front contact and tongue of relay ACA, a front contact of relay A1, the coils of relay CSC and CIR, the back contact of relay CHR to battery, causing relays CSC and CIR to operate. As these relays operate, they lock up to ground through the inner left hand tongue of relay CSC. Thus the connection to the intraoffice circuit is now completed and by virtue of the operation of relay CIR the intraoffice transmitter circuit is conditioned to seize the intraoffice circuit if it is not busy or to stand in readiness to seize it when it becomes idle. Relay CSC in operating initiates release of the common equipment and short-circuits the left hand winding of relay CRA and through its second right hand tongue opens the circuit to the right hand coil of relay CRA. Relay CRA thereupon releases and reapplies the ground to its respective point on the marking level of the selector switch 61. This ground short-circuits relay ACA which releases and unlocks all relays except relay AL that has been held operated in the common automatic switching equipment and causes the director switch 62 to step from the seventh to its eighth position. On the subsequent closing of the circuit through the pulsing unit 63, the director switch is stepped to its ninth or home position and relay A1 is held operated by a grounded circuit through the middle level of the director switch for the additional period of time that this switch is on its eighth position. This assures that relay A1 is the last of the automatic switching relays to release.

As pointed out the nine conductors of cable 69 from the message transmitter circuit terminate on the upper nine wipers of connector switch A and in the above-described operation the desired intraoffice circuit of cable 71 terminated on one of the sets of points of connector switch A. Accordingly connector switches B and C did not enter into that operation. When a connection is made to an intraoffice circuit of cable 71 terminating on a set of points on connector switch B or C, switch A functions to extend the conductors of cable 69 through its points 24 or 25 to the wipers of one of these switches.

For example, if the selection characters stored in the storage relays are KV, office call relay KM will operate when the director switch 62 steps to its seventh position and since the second selection character is the same as in the previous description the same 2L relays will be operated and ground will be applied to the same two circuits extending through contacts thereof as previously. These two circuits are multipled to various tongues of the office call relays and include tongues of office call relay KM. When relay KM operates, these two circuits are extended through contacts and springs of alternate routing jacks and by means of a conductor of the seventy-three wire cables 70 to a point on the marking level of the B connector switch. The sleeve spring of the involved alternate routing jack is multipled to similar springs of other jacks in this group and extends through the coil of relay AOB to battery. Accordingly relay AOB will be operated and a point on the marking level of the B connector switch will be grounded. As relay AOB operates it grounds the twenty-fourth point on the marking level of the A connector switch corresponding to the points of the upper nine levels thereof to which the wipers of the B connector switch are connected. Operation of relay AOB causes relay AOA to operate and cause the connector switch A to seek the grounded point on the marking level in the manner previously described and when this point is reached further stepping of the switch ceases. Simultaneously connector switch B through the operation of relay AOB is started stepping to seek its grounded point and in this case relay APBC functions to control the stepping of switch B in the same manner as relay APA controls the stepping of switch A. Relay ACBC operates when the marking wiper of switch B reaches its grounded point in the same manner as relay ACA operates when switch A reaches its grounded points.

When both relays ACA and ACBC operate, a circuit is established from ground through front contacts of these relays, a front contact of relay AI, the coils of relays CSC and CIR, contacts of relays CHR and CSR to battery resulting in the operation of relays CIR and CSC. Thus in this case the connection is completed from the intraoffice transmitter to an intraoffice circuit of cable 71 terminating in a sending circuit such as the one represented by the rectangle 75.

In much the same manner an intraoffice circuit terminating on the set of points on connector switch C is connected to the message transmitter circuit and in this case relay AOC is operated by the selection characters which also apply a ground to the proper point on the marking level of connector switch C. Relay AOC in operating grounds the twenty-fifth point on the marking level of connector switch A and initiates switches A and C into seeking the grounded points.

In each switching office one of the intraoffice circuits preferably terminates in a receiving position at a manual switching location in that office and messages may be automatically switched to such a position by perforating in the tape the call letters of the switching office. However, other messages which for some reason, such as improper selection characters that are not automatically switched, may also be directed to such a receiving position. Whenever the director switch 62 is off its home position, relay ASC is released which applies a ground to an electronic timer, indicated generally by reference numeral 76, which after an interval of approximately four seconds provided the above ground is not removed, will cause relay WTR to operate. The four-second interval is somewhat more than that required by the common equipment to complete an automatic switch and for the director switch to return to its home position. Accordingly, if an automatic switching operation once initiated has not been completed within four seconds the operation of relay WTR will apply a ground through the ninth level of the selector switch 61 and through the coil of relay CNS to operate the same. As relay CNS operates, it completes a locking circuit for itself through the upper springs of the "to manual switching" key 7, lights the "no switch" lamp 78 and causes the common switching equipment to be released.

An attendant upon seeing the "no switch" lamp 78 light may examine the message and if deemed desirable direct it to a manual switching position by actuating the "to manual switching" key 77. The operation of this key opens the locking circuit to relay CNS causing it to release and applies a ground to the coil of relay CMS causing it to operate. Relay CMS in operating locks up by a circuit through back contacts of relay CSC.

The release of relay CNS causes a new request to be initiated for the common switching equipment and the operation of relay CMS applies a ground to its associated point on the eighth level of the selector switch 61 so that immediately upon the connection of the common switching equipment, indicated by the operation of relay ACC, relay AMS of the common equipment will operate and lock up to ground through its own contacts and contacts of relay ACC. The operation of relay AMS removes ground from the wiper of the left hand level of the director switch 62 so that none of the relays of the office call selector nor relay ASP will be operated as the director switch advances from one home position to another. Relay AMS also applies ground to the two conductors 81 and 82 on which ground will normally be applied by the office call selector in responding to the call letters of the switching office. One of these grounded conductors causes the connector switch A to step while the other grounds a point on the marking level such as the twenty-third. As the connector switch A steps and reaches the grounded point, relays CIR and CSC will be operated and the common equipment released as in the previously described operations. As relay CSC operates, it opens the locking circuit to relay CMS. Thus the message in the intraoffice message transmitter is connected to an intraoffice circuit terminating in a manual switching position such as 80 connected to a set of points such as the twenty-third on the A connector switch.

Each sending circuit 75 terminating an intraoffice circuit is so arranged that when its close-out switch such as 83 is closed, 110 v. A. C. is placed on the start circuit. The message transmitter circuit is so arranged that on the application of 110 v. A. C. on the start circuit, a signal is operated to indicate that an automatic connection has been made from the transmitter circuit to a closed out sending circuit. At the transmitter circuit the start circuit extends through front contacts of relay CSC, back contacts of relays CSR and CIS, to D. C. potential. The grid of a vacuum tube 84 is tapped off the start circuit and is non-responsive to the D. C. potential that is normally applied to the start circuit. However, the application of A. C. to the start circuit from a closed out sending circuit causes vacuum tube 84 to pass plate current and operate relay CCO in its plate circuit. As relay CCO operates, it completes a circuit through the circuit closed lamp 86 which lights to indicate that an automatic connection has been made to a closed-out intraoffice circuit. In this event the attendant may operate the "to manual switching" key 77 whereby the message is directed to a manual switching position such as 80. When key 77 is operated its lower springs disconnect the message transmitter from the closed-out intraoffice circuit while its upper springs establish a circuit from ground for operating CMS. The latter relay in operating functions in the manner previously described to cause the message to be switched to a manual switching position such as 80.

At the end of a message the transmission of the double period end-of-message signal over an intraoffice circuit to a position such as the sending circuit position 75 opens the private circuit and initiates the disconnect operation. The manner in which the disconnect function is performed is fully set forth in the abovementioned application Serial No. 37,894, filed July 9, 1948, and reference may be had thereto for a description of the detailed circuits involved.

It will be obvious to those skilled in the art that various modifications of the circuits and equipment disclosed in the described embodiment of the invention may be made without departing from the spirit or essential attributes thereof, and it is desired therefore that only such limitations be placed thereon as are specifically set forth in the appended claims.

What we claim is:

1. In a telegraph switching system, a message storage medium for storing message codes with each message stored having appended thereto directing codes, message sequence number codes and end-of-message codes, message switching equipment, means for indicating the sequence numbers consecutive messages stored in said medium should have, and means controlled by the presence of an end-of-message code and the correct checking of a sequence number code in said medium against a respective one in said sequence number indicating means for enabling said directing codes to automatically control operation of said switching equipment to switch messages in said medium to desired outgoing circuits.

2. In a telegraph switching system, a message storage medium for storing therein message code groups with each message group having appended thereto directing codes, message sequence number codes and end-of-message codes, message switching equipment, a message sequence number indicator for indicating the sequence numbers consecutive messages stored in said medium should have, means for comparing the sequence numbers of messages in said medium with those in said indicator, means dependent upon the same message sequence number appearing in said medium and said sequence number indicator to partially condition said switching equipment, and means dependent upon other of said appended code groups to further condition said switching equipment.

3. In a telegraph switching system, a message storage medium for storing message code groups with each message group including message sequence number codes, message switching equipment, indicating means for indicating what the sequence numbers of consecutive messages stored in said medium should be, means for comparing the sequence number of each message stored in said medium with a number in said indicating means, and means dependent upon a similarity of numbers in said medium and in said indicating means to condition said switching equipment.

4. In a telegraph switching system, a message storage medium for storing message code groups with each message group having appended message sequence number codes, transmitting means controlled by said storage medium, message switching equipment controlled by said transmitting means, means for establishing predetermined electrical sequence number message representations, means for automatically checking the sequence numbers of consecutive messages stored in said medium against said established sequence numbers, and means operative on the failure of a message sequence number in said medium to check with a predetermined sequence number to prevent operation of said switching equipment.

5. In a telegraph system, a switching office, a plurality of outgoing lines, a storage medium for storing telegraph message code groups of signals with each message group including a message sequence number group, a device at said office for indicating the sequence numbers of message groups stored in said medium, means for comparing the sequence numbers in said medium with those in said device, switching means for switching messages in said medium to any one of said outgoing lines, and means including said device for controlling said switching means.

6. In a telegraph system, a switching office, a plurality of outgoing lines, a storage medium for storing telegraph message code groups of signals with each message group including a message directing group and a message sequence number group, a device at said office for indicating the sequence numbers of message groups stored in said medium, means for comparing the sequence numbers in said medium with those in said device, switching means for switching messages in said medium to any one of said outgoing lines, and means including said device and said message directing groups for controlling said switching means.

7. In a telegraph switching system, a switching office, a plurality of lines outgoing from said office, means at said office for storing telegraph message code groups with each group including message directing codes and message sequence codes, transmitting means controlled by said storage medium, a sequence number indicator for indicating consecutive message sequence numbers, means including said transmitting means for comparing a message sequence number of a stored message with that in said indicator, switching equipment, a second means associated with said transmitting means for controlling said equipment in accordance with said directing characters and connecting said transmitting means to a representative outgoing line, and means dependent upon the correct comparison of the sequence number of a message with that in said indicator for initiating operation of said switching means.

8. In a telegraph switching system, a switching office, a plurality of lines outgoing from said office, means at said office for storing telegraph message code groups with each group including message directing codes and message sequence codes, transmitting means controlled by said storage medium, a sequence number indicator for indicating consecutive message sequence numbers, means including said transmitting means for comparing a message sequence number of a stored message with that in said indicator, switching equipment, a second means associated with said transmitting means for controlling said equipment in accordance with said directing characters and connecting said transmitting means to a representative outgoing line, means dependent upon the correct comparison of the sequence number of a message with that in said indicator for initiating operation of said switching means, and means operative on the failure of the sequence number accompanying a message to correspond to that in said indicator to prevent operation of said switching means.

9. In a telegraph switching system, a storage medium for storing message code groups with each group including message sequence number codes, transmitting means for transmitting codes stored in said medium to selected line circuits, means representing a predetermined sequence of numbers, means for automatically checking the sequence number codes of messages stored in said medium against one of said predetermined sequence of numbers, and means operative by said transmitting means on the correct comparison of the sequence number code of a message with one of said predetermined sequence of numbers to transmit said message and sequence number to an outgoing line circuit.

10. In a telegraph switching system, a storage medium for storing message code groups with each group including message sequence number codes, transmitting means for transmitting codes stored in said medium to selected line circuits, means for establishing variable code group representations of sequence numbers, means for automatically checking the sequence number codes of different messages stored in said medium against said established sequence numbers, means for varying said established sequence numbers and means operative by said transmitting means on the correct comparison of the sequence number of a message with one of said predetermined sequence to vary the established sequence number and transmit said message and sequence number to an outgoing line circuit.

11. In a telegraph switching system, a storage medium for storing message code groups with each consecutive message group including different message sequence number codes, transmitting means for transmitting codes stored in said medium to selected line circuits, a message sequence number indicator having means for setting up consecutive number codes, means for automatically checking the sequence number codes of messages stored in said medium with assigned codes in said indicator, an alarm device, and means operative on the failure of a message sequence number code to correctly compare with its assigned code in said indicator to operate said alarm device to indicate messages out of sequence in said storage medium.

12. In a telegraph switching system, a storage medium for storing message code groups with consecutive groups normally having consecutive sequence number codes appended thereto, transmitting means for transmitting codes stored in said medium to selected line circuits, a message sequence number indicator having means for setting up consecutive number codes, said consecutive codes being assigned to consecutive messages stored in said medium, means for automatically checking the sequence number codes of messages stored in said medium against assigned codes in said indicator, an alarm device, means operative by said transmitting means on the correct comparison of the sequence number of a message with its assigned code in said indicator to transmit said message and sequence number to an outgoing line circuit, and means operative on the failure of a stored message sequence number code to compare with its assigned code in said indicator to cause said alarm device to operate and indicate an out-of-sequence message in said medium.

13. In a telegraph switching system, a storage medium for storing message code groups with consecutive groups normally having consecutive sequence number codes appended thereto, a message sequence number indicator having means for setting up consecutive number codes, said consecutive codes being assigned to consecutive messages stored in said medium, means for automatically checking the sequence number codes of messages stored in said medium against assigned codes in said indicator, an alarm device, means operative on the correct comparison of the sequence number of a message with its assigned code in said indicator to prepare for the checking of the next message sequence number, and means operative on the failure of a stored message sequence number code to compare with its assigned code in said indicator to cause said alarm device to operate and indicate an out-of-sequence message in said medium.

14. In a telegraph switching system, a message storage medium for storing therein message code groups with each message group having appended thereto directing codes, message sequence number codes and end-of-message codes, message switching equipment, a message sequence number indicator for indicating the sequence numbers consecutive messages stored in said medium should have, means for comparing the sequence numbers of messages in said medium with those in said indicator, means dependent upon the same message sequence number appearing in said medium and said sequence number indicator to partially condition said switching equipment and means depending upon the presence of an end-of-message code in said medium to permit the other of said appended code groups to further condition said switching equipment.

15. In a telegraph switching system, a message storage medium for storing therein message code groups with each message group having appended thereto directing codes, message sequence number codes and end-of-message codes, message switching equipment, a message sequence number indicator for indicating the sequence numbers consecutive messages stored in said medium should have, means for comparing the sequence numbers of messages in said medium with those in said indicator, means dependent upon the same message sequence number appearing in said medium and said sequence number indicator to partially condition said switching equipment and means to prevent operation of said switching equipment until the storage in said medium of the end-of-message codes of the message to be switched.

16. In a telegraph switching system, a message storage medium for storing therein message code groups with each message group having appended thereto directing codes, message sequence number codes and end-of-message codes, message switching means for switching stored messages to selected outgoing lines, a message sequence number indicator for indicating the sequence numbers consecutive messages stored in said medium should have, a first transmitting means and a second transmitting means controlled by said medium, means including said second transmitting means for adapting said directing codes to control said switching means, and means including said first transmitting means for checking the sequence number code of a stored message with an assigned code in said indicator and to detect an end-of-message code before operation of said switching means.

17. In a telegraph switching system, a message storage medium for storing therein message code groups with each message group having appended thereto directing codes, message sequence number codes and end-of-message codes, message switching equipment, a first transmitting means and a second transmitting means controlled by said medium, means including said second transmitting means for adapting said directing codes to control said switching equipment means for establishing a predetermined sequence of numbers, and means including said first transmitting means for checking the sequence number code of a stored message against one of said established predetermined sequence of numbers and to detect an end-of-message code before operation of said switching equipment.

GEORGE G. LIGHT.
WILLIAM B. BLANTON.

REFERENCES CITED

The following references are of record in the file of this patent:

UNITED STATES PATENTS

| Number | Name | Date |
|---|---|---|
| 1,787,715 | Berry | Jan. 6, 1931 |
| 1,835,390 | Gray | Dec. 8, 1931 |
| 2,035,725 | Senkel | Mar. 31, 1936 |
| 2,074,392 | Herbst | Mar. 23, 1937 |
| 2,193,967 | Kleinschmidt | Mar. 19, 1940 |
| 2,335,945 | Keough | Dec. 7, 1943 |
| 2,543,199 | Potts | Feb. 27, 1951 |